(12) United States Patent
Takeuchi et al.

(10) Patent No.: US 7,506,186 B2
(45) Date of Patent: Mar. 17, 2009

(54) OPTICAL DISC APPARATUS AND DISC APPARATUS

(75) Inventors: Kiyoshi Takeuchi, Tamana (JP); Hidehito Nakamura, Chikugo (JP); Takehiko Ide, Tosu (JP); Hirohisa Koizumi, Tamana (JP)

(73) Assignee: Panasonic Corporation, Osaka (JP)

( * ) Notice: Subject to any disclaimer, the term of this patent is extended or adjusted under 35 U.S.C. 154(b) by 718 days.

(21) Appl. No.: 10/921,264

(22) Filed: Aug. 19, 2004

(65) Prior Publication Data

US 2005/0088931 A1    Apr. 28, 2005

(30) Foreign Application Priority Data

| Aug. 20, 2003 | (JP) | 2003-296058 |
| Oct. 10, 2003 | (JP) | 2003-352016 |
| Jul. 20, 2004 | (JP) | 2004-211320 |

(51) Int. Cl.
G06F 1/26    (2006.01)
(52) U.S. Cl. .................................. 713/310; 702/60
(58) Field of Classification Search ................ 713/310, 713/340; 324/76.11; 702/60; 720/659
See application file for complete search history.

(56) References Cited

U.S. PATENT DOCUMENTS 5,483,656 A * 1/1996 Oprescu et al. ............. 713/320
6,476,627 B1 * 11/2002 Pelissier et al. ............. 324/760
6,810,481 B1 * 10/2004 Kawade et al. ............. 713/300

FOREIGN PATENT DOCUMENTS

| EP | 1100018 | 5/2001 |
| JP | 2001144772 | 5/2001 |
| JP | 2001177543 | 6/2001 |

* cited by examiner

Primary Examiner—Thuan N Du
(74) Attorney, Agent, or Firm—Dickinson Wright, PLLC

(57) ABSTRACT

When the USB power supply (VBUS) of the USB interface is used as the power supply for driving a conventional optical disc apparatus or disc apparatus, the supplied current exceeds the standard of USB.

An optical disc apparatus is provided with: a spindle motor for rotating and driving an optical disc; a feed motor for shifting an optical pick-up in the direction of the radius of an optical disc, the optical pick-up carrying out either read-out of data that has been written in onto an optical disc or write-in of data onto an optical disc; and an actuator for minutely correcting the position of an object lens which is provided in the above described optical pick-up and which irradiates an optical disc with a laser beam which is collected, wherein a conversion circuit for changing a signal voltage of a servo processor, which is transmitted to a driving circuit of the above described spindle motor, is placed between the above described driving circuit and the above described servo processor for controlling the above described driving circuit along a signal line, and the above described conversion circuit can be controlled by a CPU provided in the above described optical disc apparatus.

13 Claims, 21 Drawing Sheets

FIG. 5 (a)  CONFIGURATION OF VOLTAGE DIVIDING RESISTOR
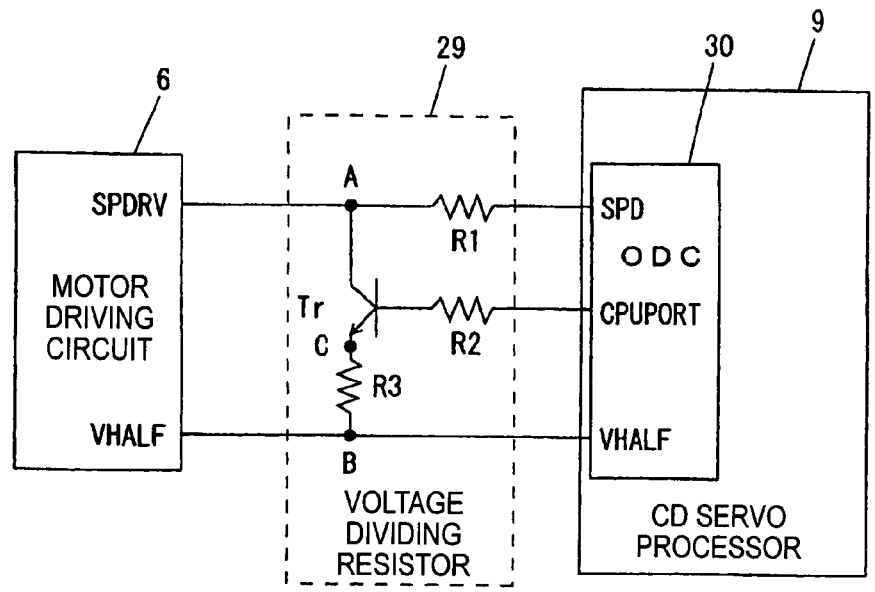
FIG. 5 (b)  EXAMPLE OF WAVEFORM OF VOLTAGE ACROSS SPDRV AND VHALF
(VOLTAGE DIVIDING RESISTOR IS OFF)
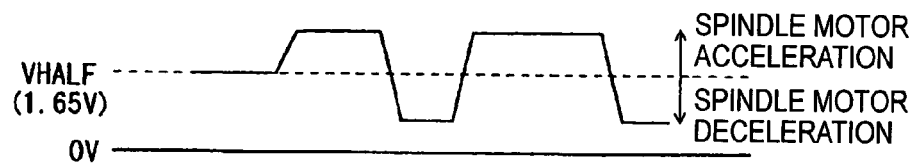
FIG. 5 (c)  EXAMPLE OF WAVEFORM OF VOLTAGE ACROSS SPDRV AND VHALF
(VOLTAGE DIVIDING RESISTOR IS ON)
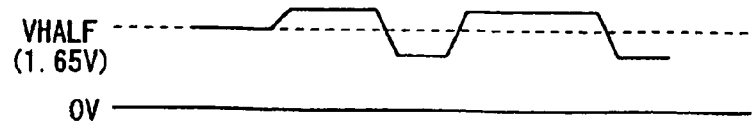

WITH VOLTAGE DIVIDING RESISTOR

BUS MODE

WITHOUT VOLTAGE DIVIDING RESISTOR

AC MODE

SECOND VOLTAGE DIVIDING RESISTOR IS ON

BUS MODE

SECOND VOLTAGE DIVIDING RESISTOR IS OFF

AC MODE

OPTICAL DISC APPARATUS AND DISC APPARATUS

BACKGROUND OF THE INVENTION

1. Field of the Invention

The present invention relates to an optical disc apparatus which is incorporated in an electronic device such as a personal computer or which is utilized by external attachment to such an electronic device. In addition, the present invention relates to a disc apparatus such as a magnetic disc apparatus.

2. Description of the Related Art

The start-up of the conventional optical media apparatus by means of a universal serial bus (hereinafter referred to as USB) interface is described in reference to a block diagram.

FIG. 14 is a block diagram showing an optical disc apparatus according to the prior art. Here, a CPU 14 carries out a logical determination or operation. A main memory 13 has a program storage area that stores a control program and a recording control program for an optical disc recording apparatus. A buffer memory 11 is utilized as a storage region that is required for data storage, recording control and reproduction control. A feed motor 2 is driven by a motor driving circuit 6. A spindle motor is denoted by 3 and is driven by motor driving circuit 6 in the same manner. A pick-up unit is denoted by 4 and is driven by an actuator driving circuit 7. Motor driving circuit 6 and actuator driving circuit 7 are servo controlled by a CD servo processor 9. In addition, power is supplied to motor driving circuit 6 by a driving system power supply circuit 8.

In a reproduction system, an optical signal acquired from optical disc 1 and pick-up unit 4 is processed by an analog signal processing part 5 so that the processed signal is used as a feedback signal of CD servo processor 9 and becomes an input signal to a digital signal processing part 10 so as to be demodulated to a digital signal, wherein the resulting signal is stored in a buffer memory 11. Buffer memory 11 is a memory for temporarily storing recording data and the demodulated data. These pieces of data are transmitted to and received from a USB conversion IC 17 by means of communication using an ATAPI bus 16 via an interface part 12.

USB conversion IC 17 converts the received ATAPI signal to USB signal 18 and is connected to an external personal computer (host computer) 20 by means of a USB cable through a USB connector 19 so that data is exchanged. A system bus 15 is a bus for data transfer within the optical disc apparatus. The CPU controls the digital signal processing part by means of a program recorded in the main memory. A power supply circuit 25 for a digital system stably supplies a variety of voltages to digital signal processing parts such as CPU 14, digital signal processing part 10 and memory 13.

The voltage supplied to circuit parts that drive these apparatuses has been converted from 100V AC to 6V DC by means of an AC adaptor 21 and is supplied to the drive through a DC jack 22. A power supply start-up circuit 23 interlocks to the voltage of a power supply terminal VBUS 24 of a USB connector 19 so as to have a system for supplying a voltage to a driving system power supply circuit 8 and to a power supply circuit 25 for a digital system wherein the drive automatically starts up and is completed by interlocking to ON/OFF of the USB power supply.

The prior art is shown in Japanese Published Patent Application 2001-144772, Japanese Published Patent Application 2001-177543 and the like.

An AC adaptor is utilized as a power supply for driving in the conventional optical disc apparatus as described above. Some devices utilizing USBs rely on the USB power supply (VBUS) of the USB interface for the power supply for driving of these devices while the maximum current supplied from the USB has been standardized as a current of 500 mA in accordance with the standard of the USB, and therefore warning is provided and the USB power supply is shut down by personal computer 20 when a current exceeding 500 mA flows.

In the case where an optical disc apparatus is connected to a computer by a connection part that has a power supply bus such as a USB as described above, when the optical disc apparatus does not utilize the AC adapter and when power can be supplied from the computer via the connection part the AC adapter becomes unnecessary and in addition, portability and ease of operation increase. However, the power consumption of the optical disc apparatus is not stable and, for example, the power consumption fluctuates at the time of the rotation acceleration and deceleration of spindle motor 3 and the power consumption also fluctuates due to the difference between the operations at the time of the data read-out and at the time of the data write-in. Accordingly, in the case where the power is supplied from the computer, the power must be supplied in a stable manner even if such fluctuations are involved. However, it is difficult to anticipate whether the ability of a computer power supply can tolerate the fluctuation of the power consumption of the optical disc apparatus, and in some cases the optical disc apparatus temporarily runs short of power during operation causing abnormal operation.

SUMMARY OF THE INVENTION

In order to solve such problems, according to the present invention, a rotation driving part for rotating an optical disc; an optical pick-up for carrying out at least read-out of data that has been written in an optical disc or write-in of data onto an optical disc; a driving part for shifting the optical pick-up in radial direction of an optical disc; a driving circuit for the above described rotation driving part; a servo processor for controlling the above described driving circuit; a signal line for connecting the above described driving circuit to the above described servo processor; a conversion circuit which is provided in the middle of the signal line and which changes the signal voltage of the above described servo processor and transmits the signal voltage to the above described driving circuit; and a control part for controlling the above described conversion circuit are provided.

As a result of this, the optical disc apparatus according to the present invention can avoid the current that is required by, for example, the apparatus or the entirety of the device from exceeding 500 mA, which is the maximum current temporarily supplied from the USB and it becomes possible for the USB power supply (VBUS) of the USB interface to be driven as the power supply.

In order to solve such problems, as set forth in the power diagnosing method for a connection device according to the present invention, a connection device for acquiring power from an electronic device and for inputting/outputting a signal is connected by means of a connection part that has both a power conveyance function and signal conveyance function; the above described connection device is test operated using a control program which is executed in the above described electronic device; the power consumption of the above described connection device is evaluated by means of the above described test operation; and whether the above described power consumption can be supplied from the above described electronic device is evaluated.

In the case where an optical disc apparatus is connected to a computer by a connection part that has a power supply bus such as a USB, first it is diagnosed whether the computer has the power supplying ability according to the present power diagnosing method for a connection device. The optical disc apparatus is operated under the operation conditions having different levels of power consumption by using a diagnosing tool which is a control program and, thereby, it can be diagnosed whether the power supplying ability of the computer on the power supplying side is sufficient and, therefore, the optical disc apparatus can be prevented from temporarily running short of power during operation which may cause an abnormal operation.

According to the present invention, the optical disc apparatus is characterized by being provided with: a rotation driving part for rotating an optical disc; an optical pick-up for carrying out at least readout of data that has been written in an optical disc or write-in of data onto an optical disc; a driving part for shifting the optical pick-up in the direction of the radius of an optical disc; a driving circuit for the above described rotation driving part; a servo processor for controlling the above described driving circuit; a signal line for connecting the above described driving circuit to the above described servo processor; a conversion circuit which is provided in the middle of the signal line and which changes the size of a signal voltage of the above described servo processor, which is transmitted to the above described driving circuit; and a control part for controlling the above described conversion circuit, and thereby, in the case where the current that flows through the spindle motor temporarily becomes excessive, the conversion circuit is operated so as to suppress the voltage of the control signal that is transmitted to the driving circuit of the spindle motor, and thereby a temporary increase in the current that flows through the spindle motor can be suppressed.

According to the invention, the optical disc apparatus is wherein the conversion circuit makes it possible to lower a signal voltage that is transmitted from the servo processor to the driving circuit according to a predetermined conversion ratio so as to output the signal voltage, and in that it is possible to switch the above described conversion ratio under the control of a CPU, and thereby the signal voltage from the servo processor transmitted to the driving circuit under the control of the CPU can be converted to a plurality of levels so that the current that flows through the spindle motor can be suppressed at a plurality of levels.

According to the invention, the optical disc apparatus wherein the conversion circuit operates so as to prevent the power or current that is consumed by the optical disc apparatus from temporarily exceeding a predetermined value, and thereby the conversion circuit is operated so that the power or current consumed by the optical disc apparatus can be prevented from temporarily exceeding a predetermined value.

According to the invention, the optical disc apparatus is wherein the conversion circuit makes it possible to lower the signal voltage according to a first conversion ratio and second conversion ratio that have been set in advance so as to output the signal voltage, wherein the voltage is reduced according to the above described first conversion ratio in response to a temporary increase in a driving current of a spindle motor, and wherein the voltage is reduced according to the above described second conversion ratio in response to a temporary increase in a driving current of an actuator, and thereby the conversion circuit operates in response to a temporary increase in the current at the time of the operation of the optical disc apparatus so that this increase can be reduced.

According to the invention, the optical disc apparatus is wherein: a driving circuit of a spindle motor has an input part of a reference potential and an input part of a signal potential; the servo processor has an output part of the reference potential, an output part of the signal potential and an output part of the signal potential for operating the conversion circuit; the input part of the above described reference potential and the output part of the reference potential are connected in line; the above described conversion circuit is formed of a switching part as well as first resistor and second resistor; the above described switching part has first and second terminals having switching functions as well as a third terminal for inputting a signal that controls the openings and closings of the above described first and second terminals; the above described first resistor is connected between the input part of the above described signal potential and the output part of the signal potential; the first terminal of the above described switching part is connected to a wire that is branched from the line between the above described first resistor and the input part of the above described signal potential; the second terminal of the above described switching part is connected to the above described second resistor; and the other end of the above described second resistor is connected to a wire that is branched from the line between the input part of the above described reference potential and the output part of the reference potential, and thereby, the conversion circuit lowers the signal voltage, which is a voltage between the reference potential of the servo processor and the signal potential, by means of voltage dividing so that the lowered voltage can be transmitted to the driving circuit of the spindle motor.

According to the invention, the optical disc apparatus is wherein: a plurality of conversion circuits is provided; a driving circuit of a spindle motor has an input part of a reference potential and an input part of a signal potential; the servo processor has an output part of the reference potential, an output part of the signal potential and output parts of a plurality of signal potentials for operating the above described conversion circuits; the input part of the above described reference potential and the output part of the reference potential are connected in line; each of the above described conversion circuits is formed of a switching part as well as first and second resistors; the first resistor is shared by all of the conversion circuits and is connected between the input part of the above described signal potential and the output part of the signal potential; each of the above described switching parts has first and second terminals having switching functions as well as a third terminal for inputting a signal that controls the openings and closings of the above described first and second terminals; the above described first resistor is connected between the input part of the above described signal potential and the output part of the signal potential; the first terminal of each of the above described switching parts is connected to a wire that is branched from the line between the above described first resistor and the input part of the above described signal potential; the second terminal of the above described switching part is connected to the above described second resistor; and the other end of the above described second resistor is connected to a wire that is branched from the line between the input part of the above described reference potential and the output part of the reference potential, and thereby, the plurality of conversion circuits lowers the signal voltage, which is a voltage between the reference potential of the servo processor and the signal potential, by means of voltage dividing so that the lowered voltage into voltages at a plurality of levels can be transmitted to the driving circuit of the spindle motor.

According to the invention, the optical disc apparatus is wherein the switching part is formed of a transistor and a resistor, wherein the first terminal is the collector of the above described transistor, the second terminal is the emitter of the above described transistor, the third terminal is an end of the above described resistor and the other end of the above described resistor is connected to the base of the above described transistor, and thereby, the conversion circuit can be formed in a simple configuration.

According to the invention, the optical disc apparatus is wherein power is a VBUS (voltage bus) of a universal serial bus (USB) interface, and thereby, the current that is supplied from the USB can be prevented from exceeding 500 mA, which is the maximum current, due to appropriate configuration and operation of the conversion circuit.

According to the invention, the optical disc apparatus according is wherein the conversion circuit is controlled by a program that is recorded in a memory and is executed by a control part, and thereby, the control of the conversion circuit can be easily carried out in detail.

According to the invention, a disc apparatus is characterized by comprising: a rotation driving part for rotating a disc; a recording or reproduction part for carrying out at least either read-out of data that has been written in a disc or write-in of data onto a disc; a driving part for shifting the above described recording or reproduction part in the direction of the radius of a disc; a driving circuit for the above described rotation driving part; a servo processor for controlling the above described driving circuit; a signal line for connecting the above described driving circuit to the above described servo processor; a conversion circuit which is provided in the middle of the above described signal line and which changes the size of the signal voltage of the above described servo processor, which is transmitted to the above described driving circuit; and a control part for controlling the above described conversion circuit, and thereby, in the case where the current that flows through the spindle motor becomes temporarily excessive, the conversion circuit is operated so that the voltage of the control signal transmitted to the driving circuit of the spindle motor can be suppressed, and as a result a temporary increase in the current that flows through the spindle motor can be suppressed.

According to the invention, a power diagnosing method for a connection device is characterized in that: a connection device for acquiring power from an electronic device and for inputting/outputting a signal is connected by means of a connection part having both a power conveyance function and signal conveyance function; the above described connection device is test operated by using a control program that is executed in the above described electronic device; the power consumption of the above described connection device is evaluated from the result of the above described test operation; and whether the above described power consumption can be supplied from the above described electronic device is evaluated, the connection device can be operated with different levels of power consumption by using the control program so that it can be diagnosed whether the power supplying ability of the electronic device on the power supplying side is sufficient and, therefore, the connection device can be prevented from temporarily running short of power during operation which may cause an abnormal operation.

According to the invention, the power diagnosing method for a connection device is characterized in that, according to the test operation, the connection device is operated at one type of or a plurality of types of operation setting(s) by using the control program so that it is evaluated whether the power consumption in each of the operation conditions can be supplied from the electronic device, the power consumption by the connection device can be evaluated in detail by the test operation so that whether the power supplying ability of the electronic device on the power supplying side is sufficient can be diagnosed without fail and, therefore, the connection device can be prevented from temporarily running short of power during operation which may cause an abnormal operation.

According to the invention, the power diagnosing method for a connection device is characterized in that the evaluation of whether the power consumption by the connection device can be supplied from the electronic device is recognized by the control program due to the change in the signal transmitted from the above described connection device to the above described electronic device in the case where the above described power consumption exceeds the power that can be supplied by the above described electronic device, a signal is continuously transmitted to the electronic device from the connection device, for example, during test operation so that the transmission of the signal is ceased due to excessive power consumption by the connection device under setting of the test operation and thus the control program can recognize excessive power consumption by the connection device under this setting of operation. As a result, the control program can recognize excessive power consumption by the connection device without providing complicated determination function or the like to the connection device.

According to the invention, the power diagnosing method for a connection device, is characterized in that the user can operate the control program on the electronic device and the result of the evaluation of whether the power consumption by the connection device can be supplied by the electronic device is displayed on a display apparatus of the electronic device, the user can easily operate the present power diagnosis.

According to the invention, the power diagnosing method for a connection device, is characterized in that the operation settings include the settings for operations having at least different power consumption of the connection device, the power consumption that can occur in the connection device can be evaluated in advance by appropriately setting the operation and, thereby, the connection device can be prevented from temporarily running short of power during operation which may cause an abnormal operation.

According to the invention of claim 6, the power diagnosing method for a connection device as set forth in claim 2, characterized in that the operation settings at least include the operation where the power consumption of the connection device becomes the maximum or approximately the maximum, the maximum or approximately maximum power consumption that can occur in the connection device can be evaluated in advance and, thereby, the connection device can be prevented from temporarily running short of power during operation which may cause an abnormal operation.

According to the invention, the power diagnosing method for a connection device, is characterized in that: the test operation has a plurality of types of operation settings; the operation of the connection device is carried out under the above described plurality of types of operation settings by changing from the operation setting where the power consumption is lower for the operation setting where the power consumption is higher; and the setting where the power consumption is the highest, which allows for the power supply from an electronic device during the setting of the above described plurality of types of settings, it becomes possible to achieve on operation under a user environment at optimal operation conditions.

According to the invention, the power diagnosing method for a connection device, is characterized in that: the electronic device is a computer; the connection part is a USB (universal serial bus); and the connection device is an optical disc apparatus, whether an optical disc can be utilized having the USB as the power supply can be determined by the user with an easy operation as set forth in the present power diagnosing method in the case where the optical disc apparatus is connected to the computer by means of the USB.

According to the invention, a connection device to which power is supplied from the outside and which allows for a test operation by means of an instruction from the outside, characterized in that: the conditions for allowing the operation by means of power that can be supplied from the outside are determined externally by the test operation; the data which is inputted from the outside and which corresponds to the conditions for allowing the above described operation is stored in a storage part; and a control part controls the respective parts on the basis of the data that is stored in the above described storage part, the connection device stores the operation conditions which make the power consumption of the connection device excessive and which has been clarified by instruction and by determination from the outside, the connection device is operated by avoiding such operation conditions and, thereby, the possibility of a stable operation of the connection device by supplying power from the outside, such as from the electronic device, can be enhanced.

According to the invention, an optical disc apparatus to which the power is supplied from the outside and in which a test operation can be carried out by means of an instruction from the outside, comprising: a rotation driving part for rotating an optical disc; a recording and/or reproduction part for carrying out at least either recording or reproduction of data by irradiating an optical disc with light; a guide part for supporting the above described recording or reproduction part so as to be moveable in a predetermined range in the directions towards and away from the above described rotation driving part; a feed part for shifting the above described recording or reproduction part along the above described guide part; a control part for controlling the entirety and a storage part, wherein: the respective parts, such as the above described rotation driving part, the above described recording or reproduction part and the above described feed part are operated in the test operation, and thereby, the conditions for allowing the operation by means of power that can be supplied from the outside are determined from the outside; the data which is inputted from the outside and which corresponds to the conditions for allowing the above described operation is stored in the above described storage part; and the above described control part controls the respective parts on the basis of the data that is stored in the above described storage part, the optical disc apparatus stores the operation conditions which make the power consumption of the optical disc apparatus excessive and which are clarified by the instruction and determination of the test operation by using the control program from the outside such as the computer or the electronic device, in the storage part and, thereby, the possibility of a stable operation of the connection device by supplying power from the outside, such as from the electronic device, can be enhanced.

According to the invention, the optical disc apparatus is characterized by being connected to the outside by means of a USB (universal serial bus), data is transmitted to and received from the power supply from the computer by means of the USB and the optical disc apparatus stores the operation conditions which make the power consumption of the optical disc apparatus excessive and which are clarified by instruction and determination of the test operation by using the control program from the outside such as the computer or the electronic device, in the storage part and, thereby, the possibility of a stable operation of the connection device by using the USB as the power supply, can be enhanced.

BRIEF DESCRIPTION OF THE DRAWINGS

FIG. 5 is a diagram showing the configuration of voltage dividing resistors of the optical disc apparatus according to one embodiment of the present invention;

DESCRIPTION OF THE PREFERRED EMBODIMENTS

In the following, the best mode for carrying out the invention is described in reference to the drawings.

Embodiment 1

Figure 1:
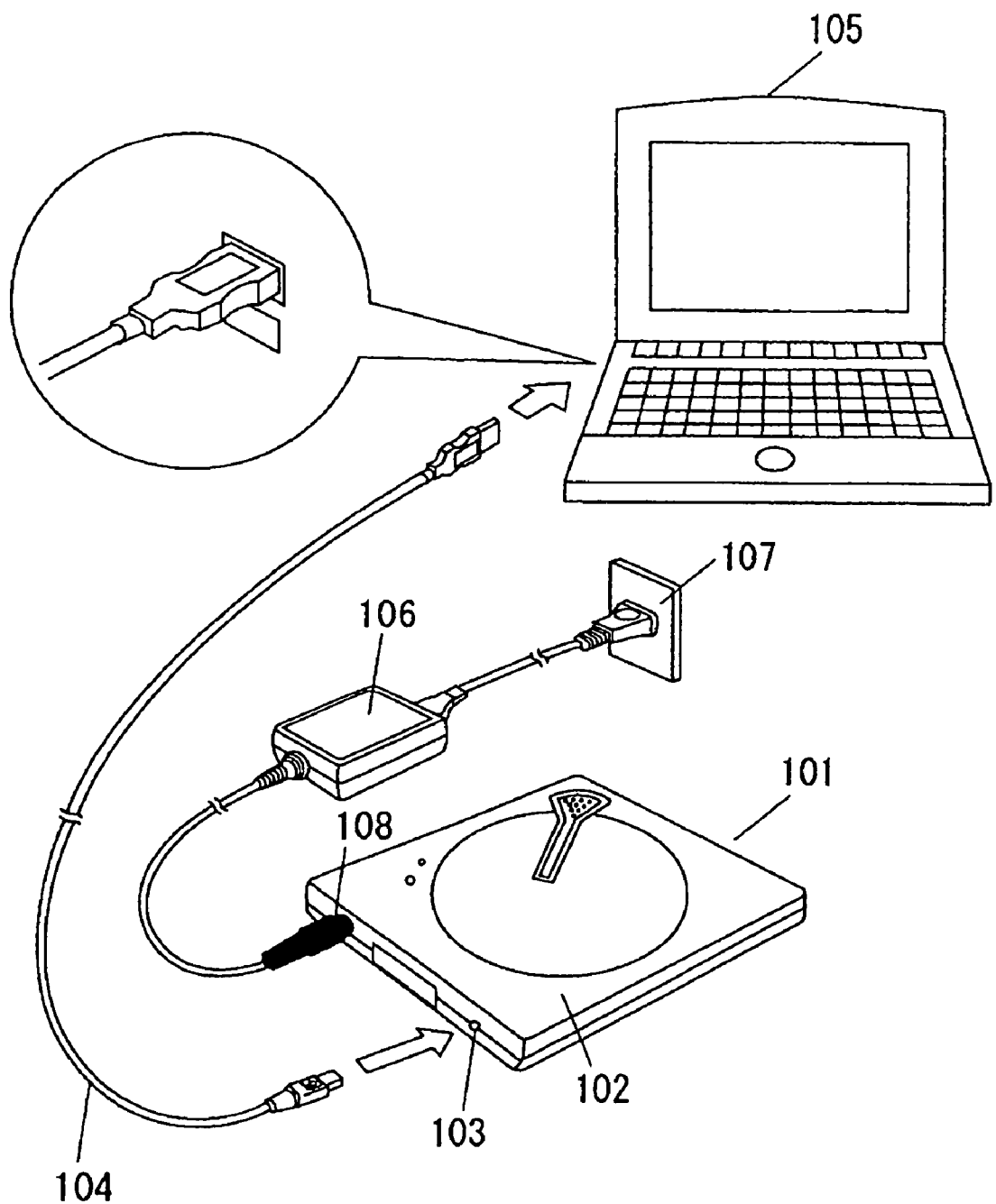
FIG. 1 is a view showing an appearance of the optical disc apparatus according to one embodiment of the present invention.
Figure 2:
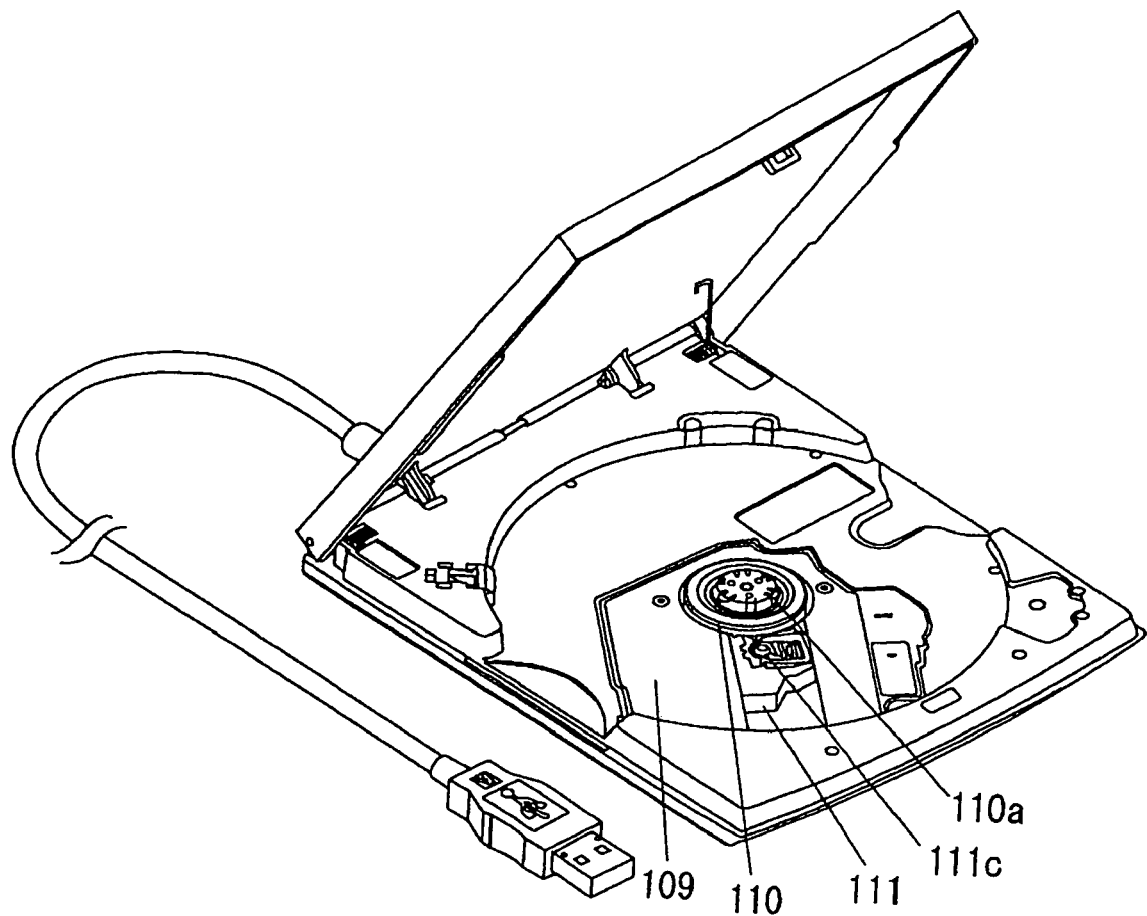
FIG. 2 is a view showing an appearance of the optical disc apparatus according to one embodiment of the present invention in the condition where the upper lid is open.
Figure 3:
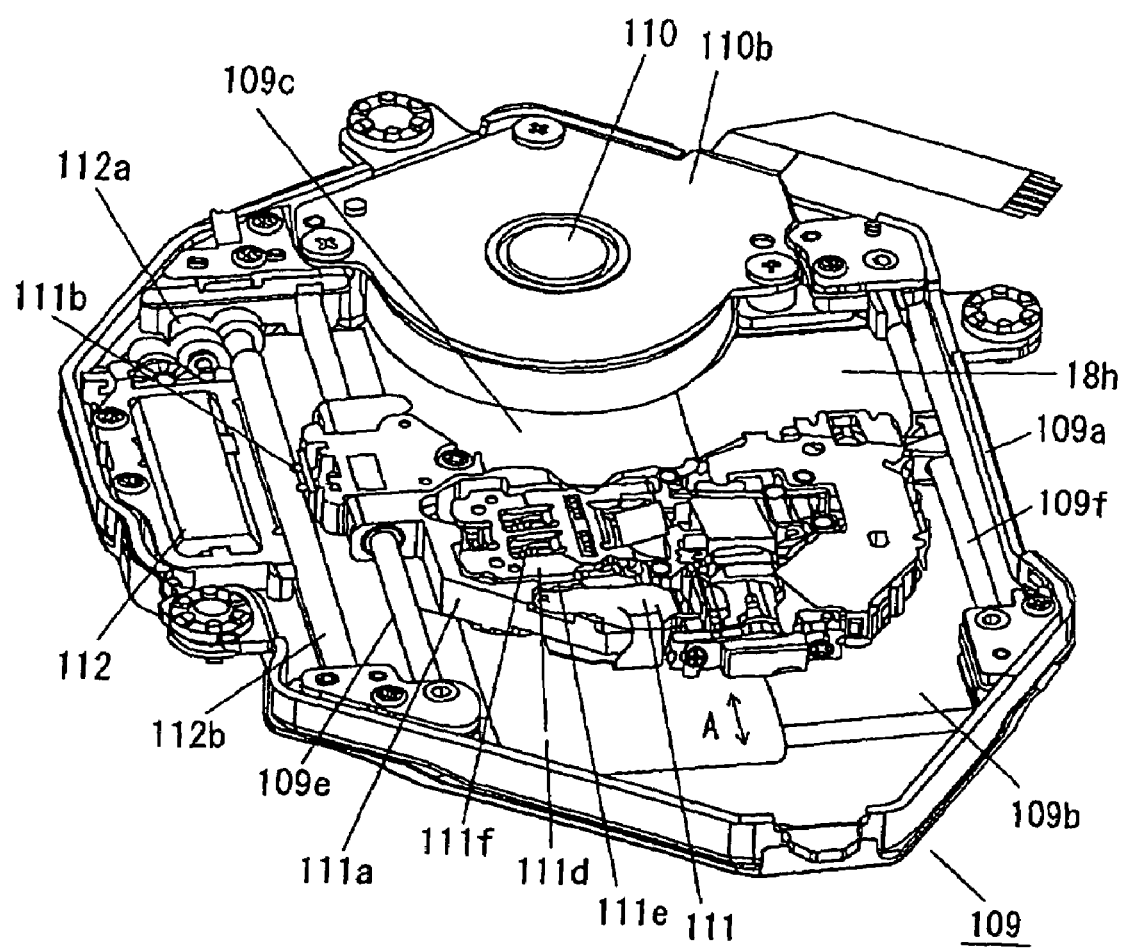
FIG. 3 is a view showing an appearance of the pick-up module of the optical disc apparatus according to one embodiment of the present invention as viewed from the back side.
Figure 4:
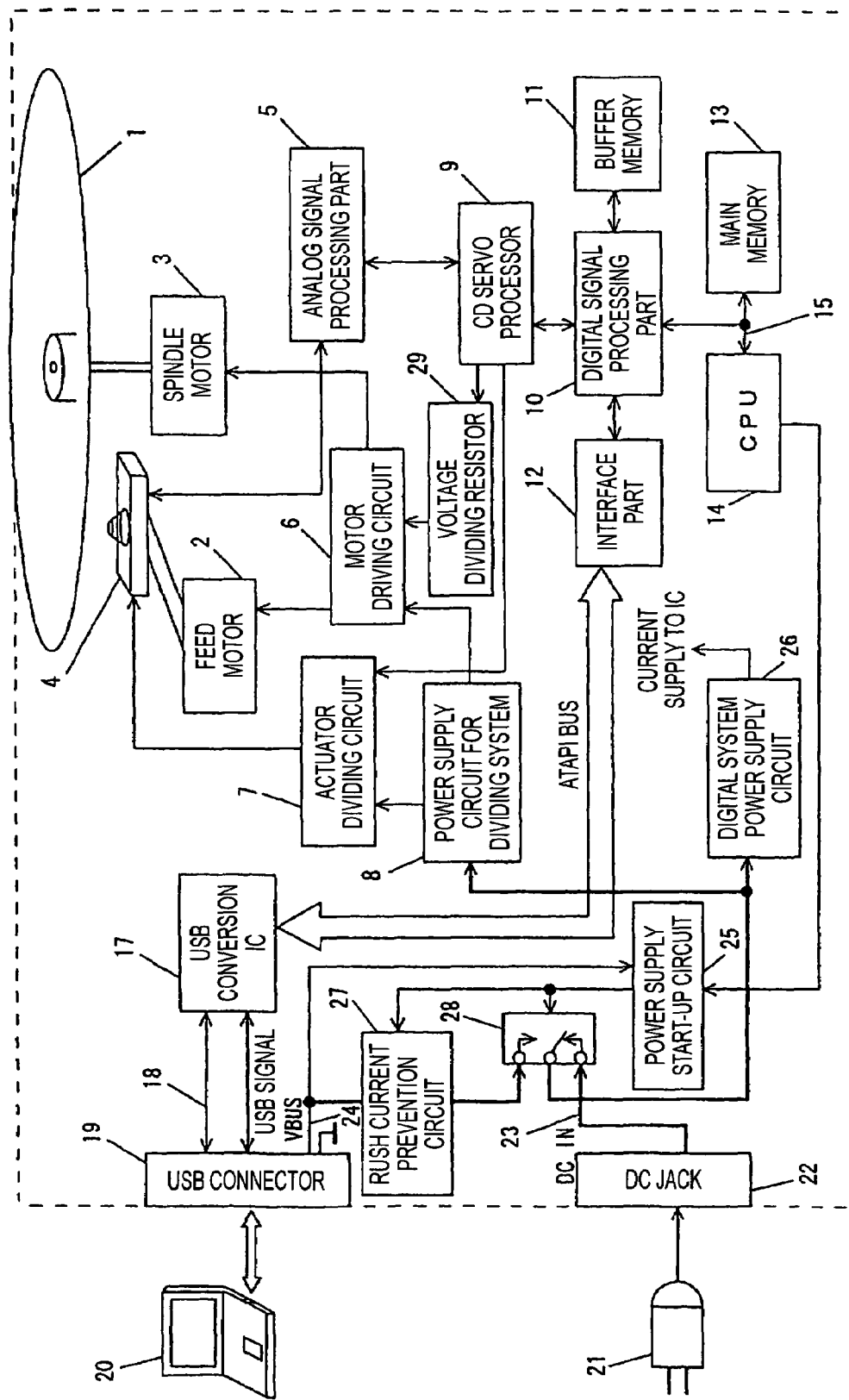
FIG. 4 is a block diagram showing the configuration of the optical disc apparatus corresponding to the USB power supply according to one embodiment of the present invention.
Figure 6:
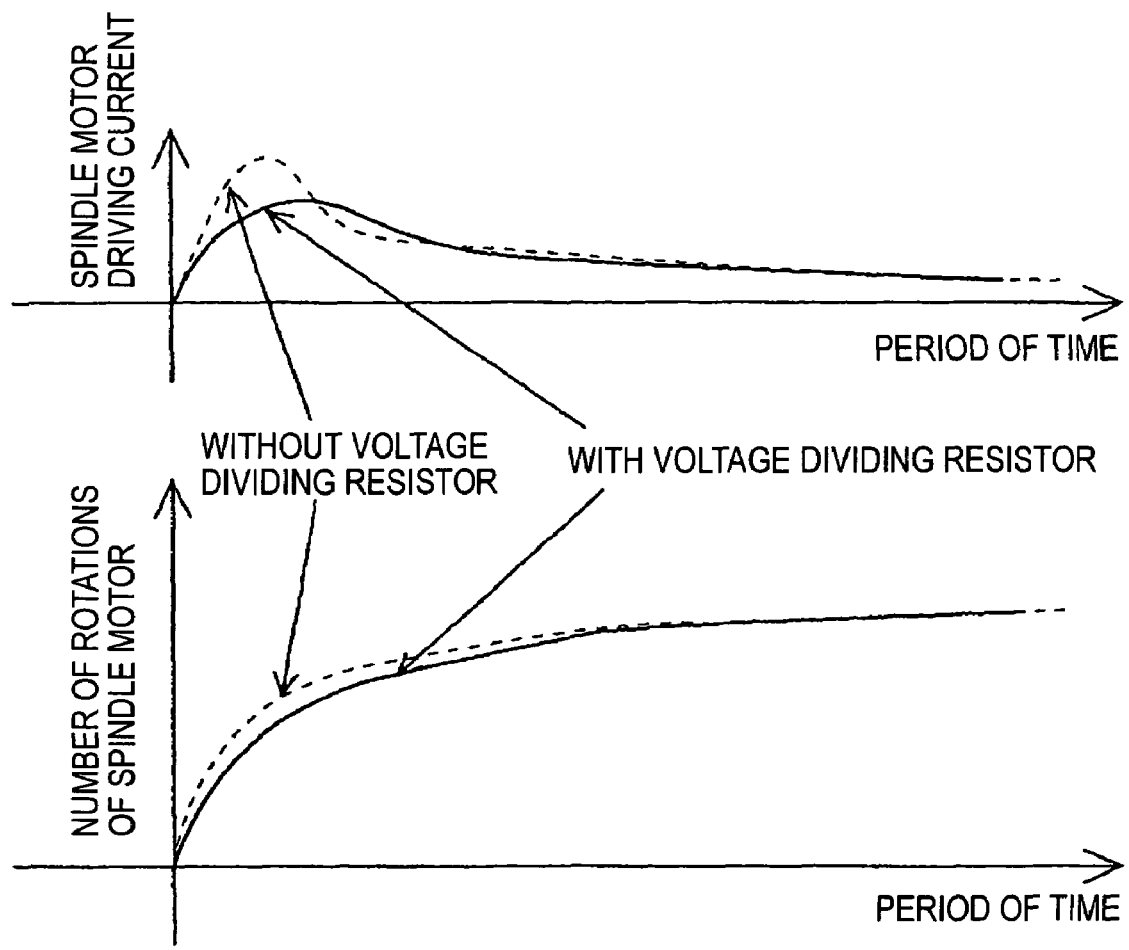
FIG. 6 is a pair of graphs showing a change in the number of rotations and a change in the driving current at the time of the start-up of the spindle motor at the time of the presence and non-presence of the voltage dividing resistors of the optical disc apparatus according to one embodiment of the present invention.
Figure 7:
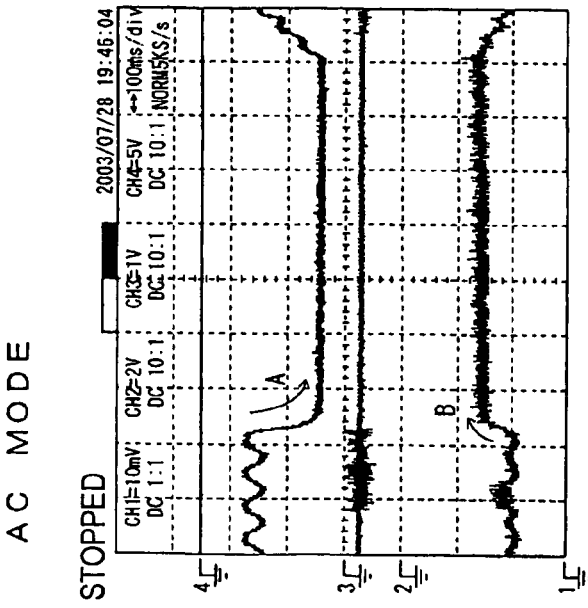
FIG. 7 is a pair of graphs showing the data measuring different spindle motor driving currents at the point when the spindle motor starts up at the time of the presence and non-presence of the voltage dividing resistors of the optical disc apparatus according to one embodiment of the present invention.
Figure 7:
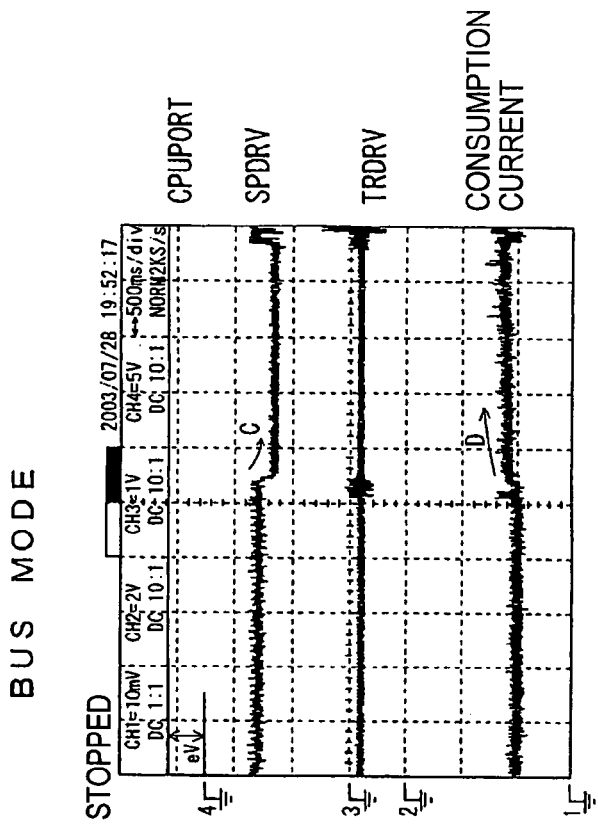
Figure 8:
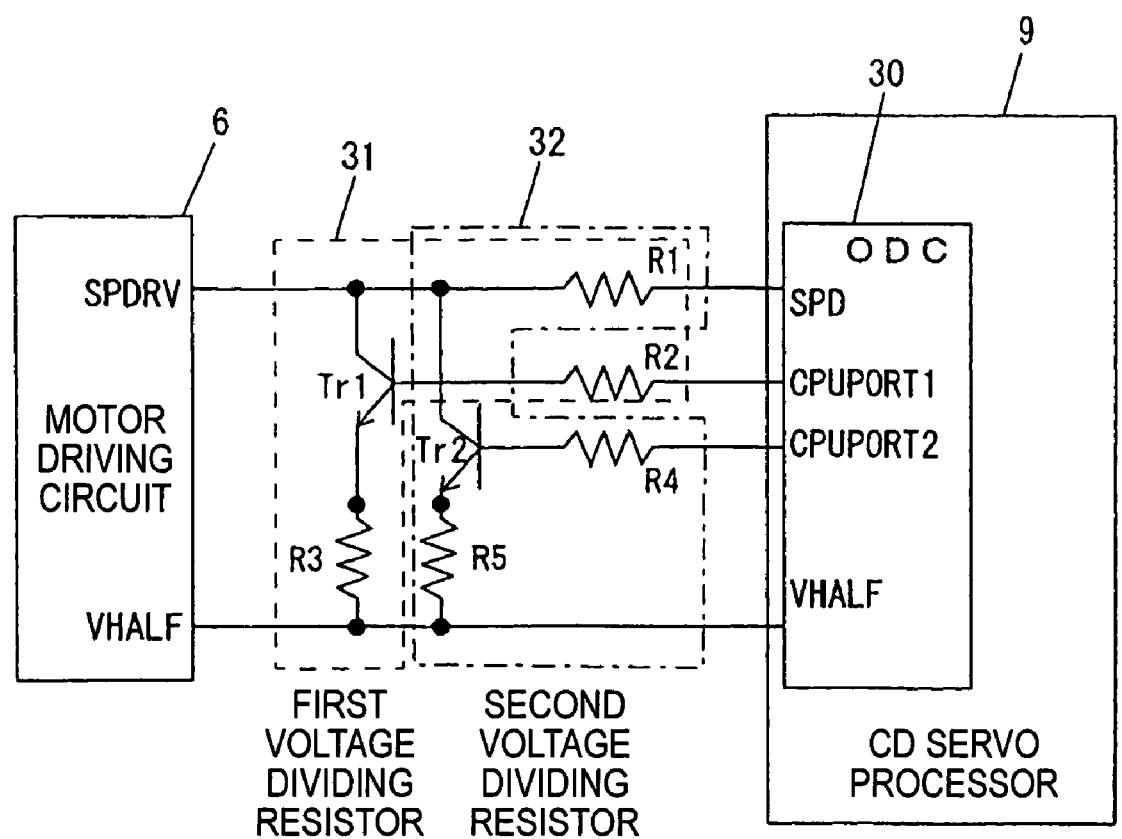
FIG. 8 is a diagram showing another configuration of the voltage dividing resistors of the optical disc apparatus according to one embodiment of the present invention.
Figure 9:
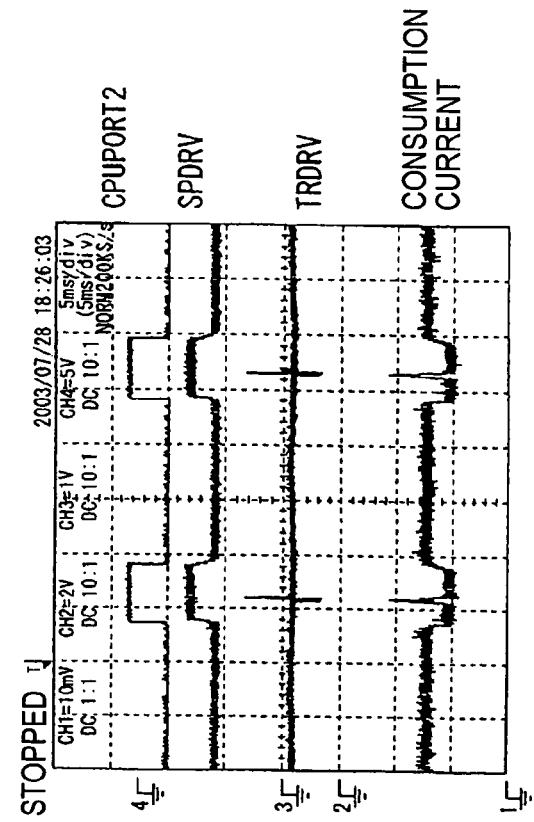
FIG. 9 is a pair of graphs showing the data measuring different spindle motor driving currents at the time of the presence and non-presence of the voltage dividing resistors of the optical disc apparatus according to another embodiment of the present invention.
Figure 9:
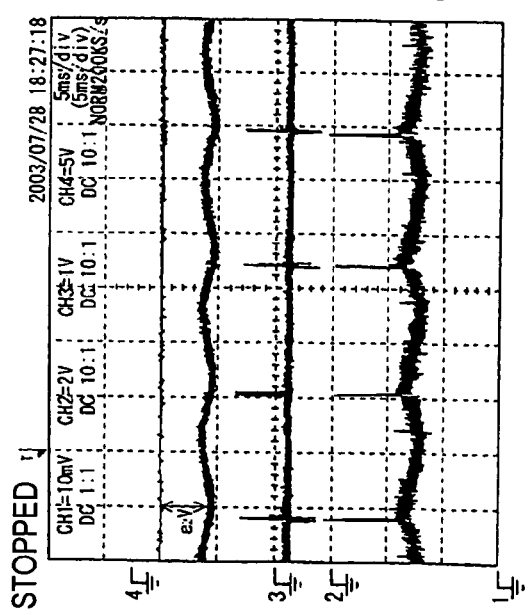
Figure 10:
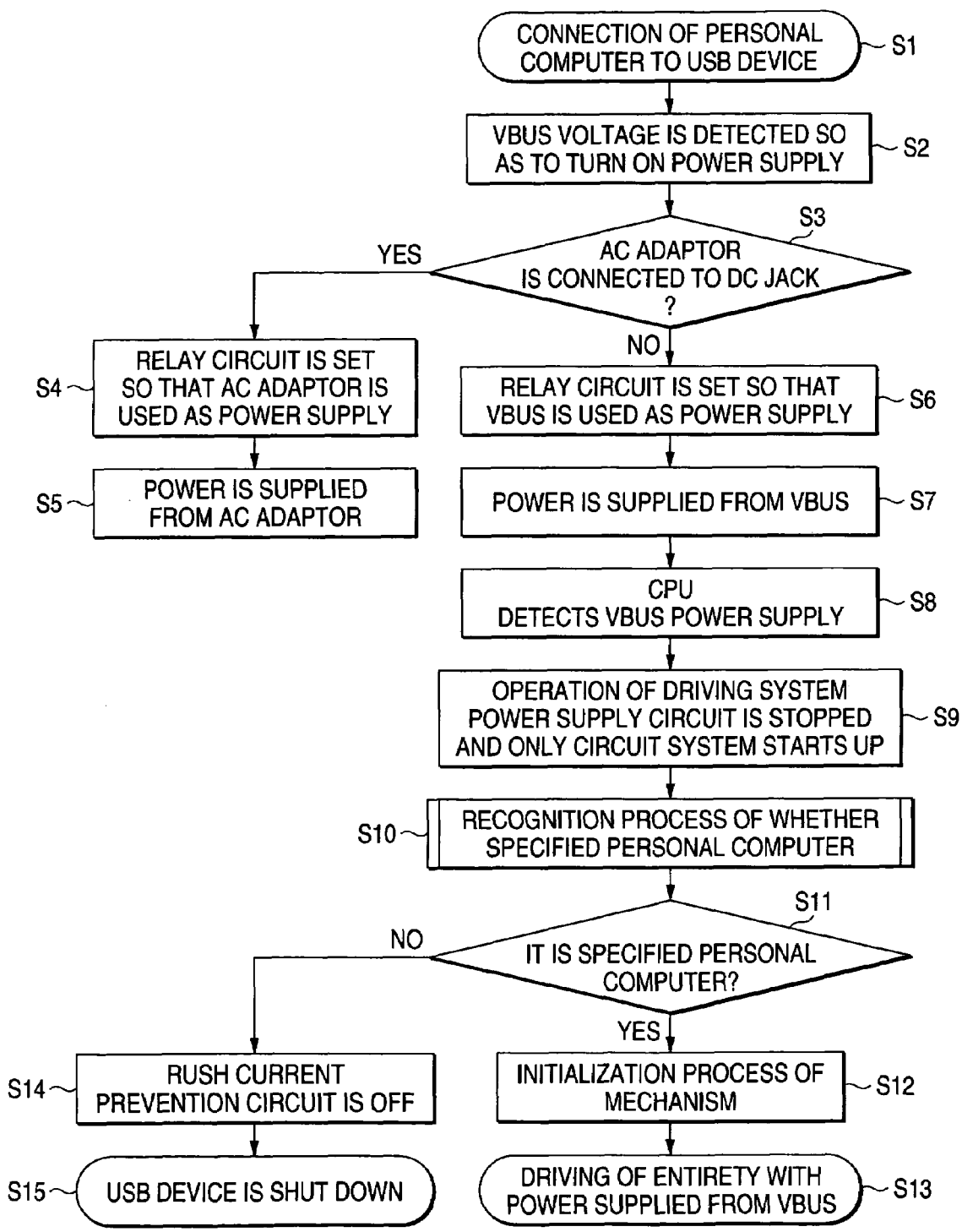
FIG. 10 is a flow chart showing the control of the operations of the USB power supply and the AC adaptor power supply.
Figure 11:
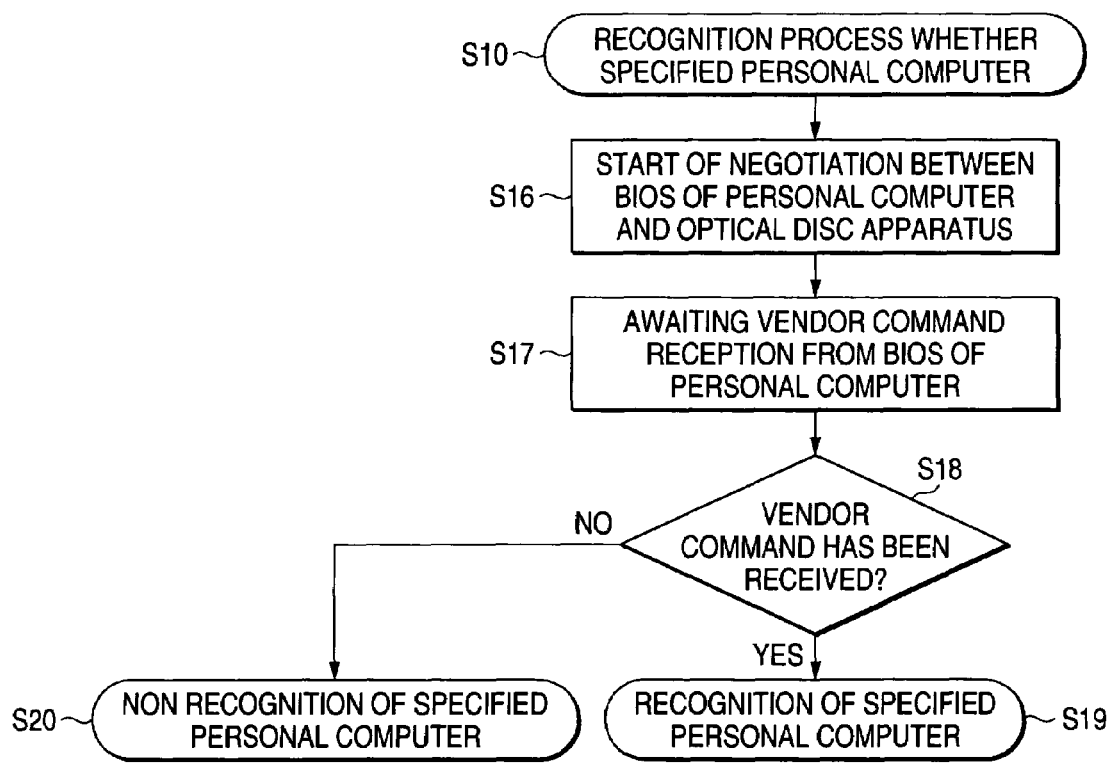
FIG. 11 is a flow chart showing the control of the optical disc apparatus that confirms whether the personal computer can supply 500 mA or more.
Figure 12:
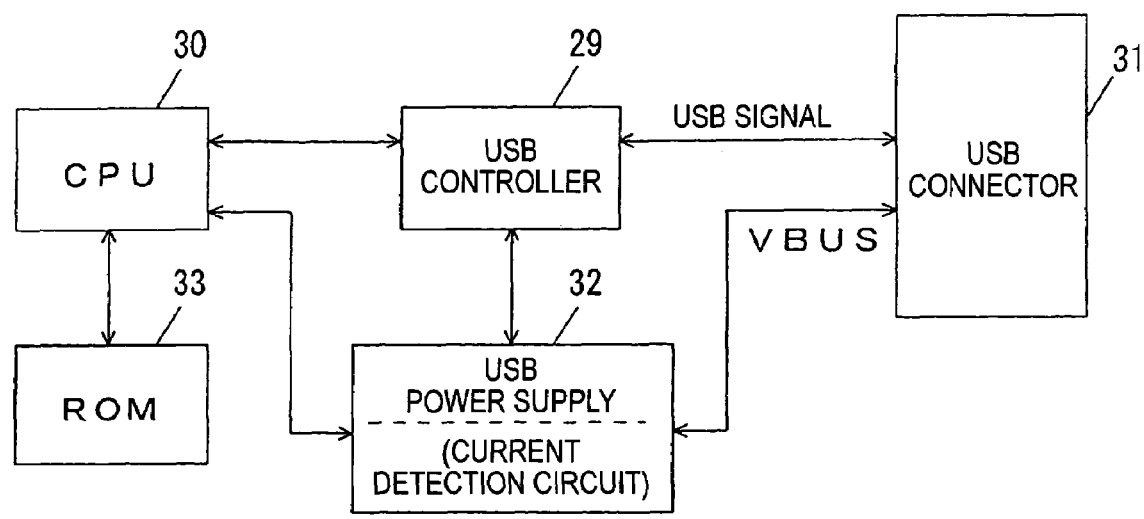
FIG. 12 is a block diagram showing a USB output part of a personal computer to which the optical disc apparatus according to the present invention is connected and which allows for a power supply to the optical disc apparatus by means of the USB.
Figure 13:
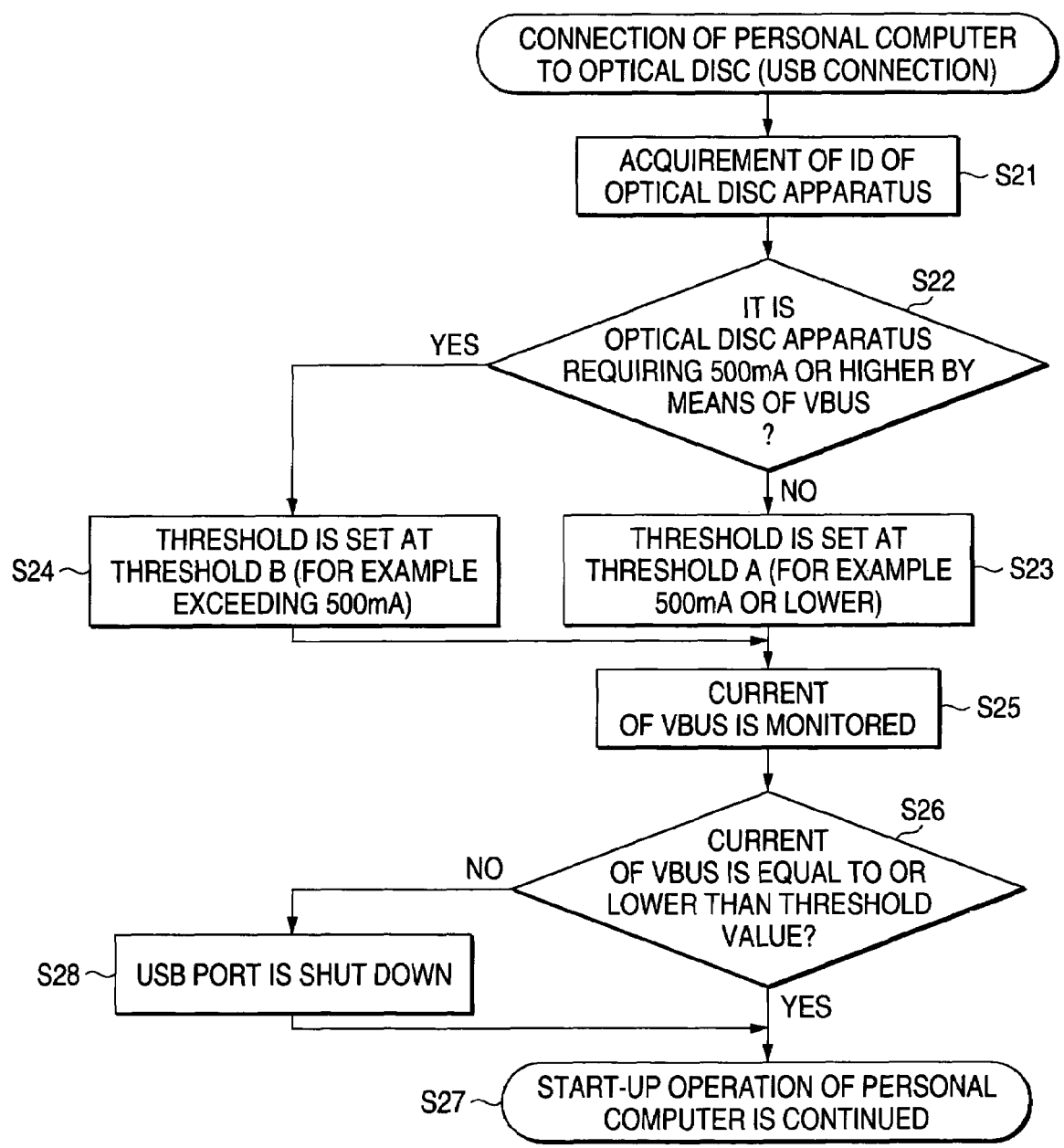
FIG. 13 is a flow chart showing the control of a personal computer to which the optical disc apparatus according to the present invention is connected and which allows for a power supply to the optical disc apparatus by means of the USB when the optical disc apparatus is connected to the personal computer.
Figure 14:
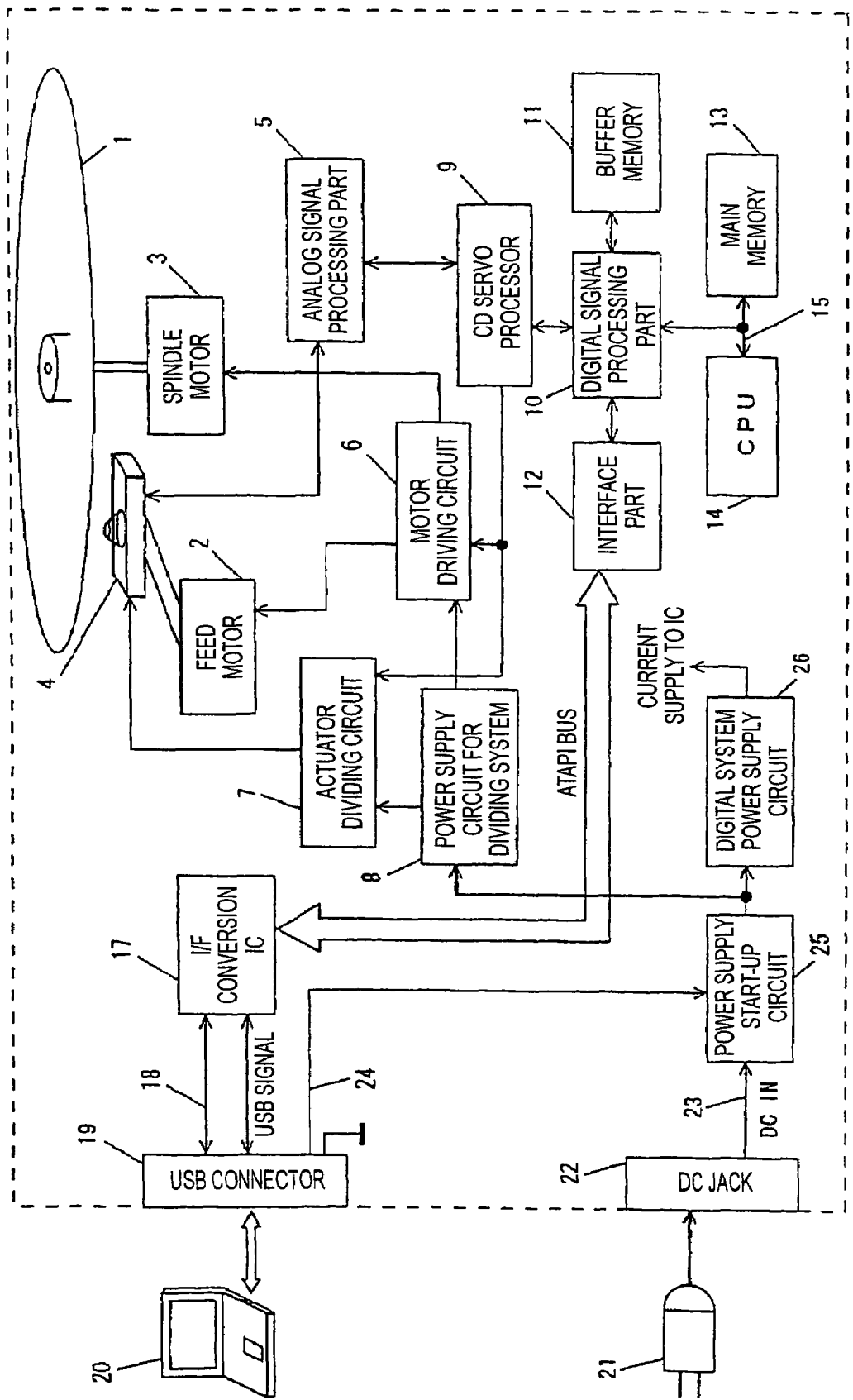
FIG. 14 is a block diagram showing an optical disc apparatus according to the prior art.

FIG. 1 is a view showing an appearance of the optical disc apparatus according to one embodiment of the present invention, FIG. 2 is a view showing an appearance of the optical disc apparatus according to one embodiment of the present invention in the condition where the upper lid is open, FIG. 3 is a view showing an appearance of the pick-up module of the optical disc apparatus according to one embodiment of the present invention as viewed from the back side, FIG. 4 is a block diagram showing the configuration of the optical disc apparatus corresponding to the USB power supply according to one embodiment of the present invention, FIG. 5 is a diagram showing the configuration of voltage dividing resistors of the optical disc apparatus according to one embodiment of the present invention, FIG. 6 is a pair of graphs showing a change in the number of rotations and a change in the driving current at the time of the start-up of the spindle motor at the time of the presence and non-presence of the voltage dividing resistors of the optical disc apparatus according to one embodiment of the present invention, FIG. 7 is a pair of graphs showing the data measuring different spindle motor driving currents at the point when the spindle motor starts up at the time of the presence and non-presence of the voltage dividing resistors of the optical disc apparatus according to one embodiment of the present invention, FIG. 8 is a diagram showing another configuration of the voltage dividing resistors of the optical disc apparatus according to one embodiment of the present invention, FIG. 9 is a pair of graphs showing the data measuring different spindle motor driving currents at the time of the presence and non-presence of the voltage dividing resistors of the optical disc apparatus according to another embodiment of the present invention, FIG. 10 is a flow chart showing the control of the operations of the USB power supply and the AC adaptor power supply, FIG. 11 is a flow chart showing the control of the optical disc apparatus that confirms whether the personal computer can supply 500 or more mA, FIG. 12 is a block diagram showing a USB output part of a personal computer to which the optical disc apparatus according to the present invention is connected and which allows for a power supply to the optical disc apparatus by means of the USB, and FIG. 13 is a flow chart showing the control of a personal computer to which the optical disc apparatus according to the present invention is connected and which allows for a power supply to the optical disc apparatus by means of the USB at the time when the optical disc apparatus is connected to the personal computer.

In FIG. 1, an optical disc apparatus 101 is of a so-called external type which is not incorporated in an electronic device such as a personal computer, wherein an optical disc is mounted by opening an upper lid 102. A connector for USB connection, which is denoted by 103, is connected to, for example, a personal computer 105 by means of a USB cable 104, and thereby, the personal computer can read out data from the optical disc or write in data onto the optical disc. An AC adapter, which is denoted by 106, lowers the voltage and rectifies the current from an outlet 107 of the commercial power supply (for example 100V) and supplies the lowered voltage and the rectified current to optical disc apparatus 101 from a DC jack 108. As described in detail later, there are cases where the acquirement of power for optical disc apparatus 101 depends on AC adapter 106 and USB cable 104 as well as the case where AC adapter 106 is not utilized. Optical discs include CD-ROMs, CD-R/RWs, DVD-ROMs, DVD-RAMs, DVD-R/RWs and DVD+R/RWs, and optical disc apparatus 101 is compatible with one type or a plurality of types of these optical discs.

In the present embodiment, though the USB interface is adopted as a means for connection with another electronic device such as a personal computer, any means for connection having a power conveyance function and signal conveyance function together may be used and may be the IEEE1394 interface.

Here, AC adapter 106 may not be utilized, but rather a configuration wherein the commercial power supply is directly drawn in by an appropriate wire, and a connector may be used in the case where the optical disc apparatus is provided with a power supply circuit for converting the commercial power supply to a current and a voltage that are appropriate for internal utilization of the optical disc apparatus. In addition, a battery may be incorporated in or externally attached to the optical disc apparatus as the power supply for driving the optical disc apparatus in place of the commercial power supply.

The mechanical configuration of the optical disc apparatus is described in reference to the drawings.

In FIG. 2, pick-up module 109 is seen when upper lid 102 is open and pick-up module 109 is formed of spindle motor 110 and optical pick-up 111. A disc mounting part 110a for mounting an optical disc is formed on top of spindle motor 110.

In FIG. 3, spindle motor 110 is attached to a frame 109a via a bottom plate 110b by means of screws or the like. The part of spindle motor 110 on which a disc is mounted protrudes to the side on which a disc is mounted through a through-hole 109c of a cover 109b.

A carriage 111a of optical pick-up 111 is supported so as to be freely moveable by two shafts 109e and 109f approximately parallel to each other, which are fixed to frame 109a.

A feed motor 112 is fixed to frame 109a so as to rotate a rotation shaft 112b that is attached to frame 109a so as to be freely rotated via a gear group 112a. Rotation shaft 112b is provided in the vicinity of shaft 109e and is attached approximately parallel to shaft 109e. In addition, rotation shaft 112b is provided to the opposite side of shaft 109f relative to shaft 109e. A spiral trench is provided in rotation shaft 112b so as to engage with a guide 111b provided in carriage 111a. Guide 111*b* and carriage 111*a* shift in the two directions (directions of arrow A) along shafts 109*e* and 109*f* due to the rotation of rotation shaft 112*b*. As described above, feed motor 112, rotation shaft 112*b* and gear group 112*a* as means for shifting carriage 111 are contained on the opposite side of carriage 111*a* relative to shaft 109*e*. Carriage 111*a* is formed of a die-cast of a metal material where an optical system for carrying out readout and write-in of a disc is mounted.

An object lens 111*c* (see FIG. 2) from among the optical system mounted on carriage 111*a* is formed on actuator 111*d*. Actuator 111*d* is supported by a damper 111*e* so as to be attached to carriage 111*a*. In addition, an actuator coil 111*f* is provided to actuator 111*d*. Actuator coil 111*f* makes actuator 111*d* operate by dynamically correcting the movement of a laser beam on a disc so that object lens 111*c* is moved so as to correct the position of the laser beam.

Next, the configuration of the circuit system of the optical disc apparatus is described in reference to FIG. 4. The CPU is denoted by 12 and carries out a logic determination and an operation. The main memory is denoted by 13 and has a program storage area that stores a control program and a recording control program for the optical disc recording apparatus. A buffer memory is denoted by 11 and is utilized as a storage region required for data storage, recording control and reproduction control. A feed motor is denoted by 2 and is driven by a motor driving circuit 6. A spindle motor is denoted by 3 and is driven by motor driving circuit 6 in the same manner. A pick-up unit is denoted by 4 and is driven by an actuator driving circuit 7. Motor driving circuit 6 and actuator driving circuit 7 are servo controlled by a CD servo processor 9. A voltage dividing resistor 29 is placed between motor driving circuit 6 and CD servo processor 9. In addition, power is supplied to motor driving circuit 6 by driving system power supply circuit 8.

In the reproduction system an optical signal acquired from optical disc 1 and optical pick-up 4 is processed in analog signal processing part 5 and is used as a feedback signal to CD servo processor 9, and at the same time becomes an input signal to digital signal processing part 10 so as to be demodulated to a digital signal, and the resulting signal is stored in buffer memory 11. Buffer memory 11 temporarily stores recording data and the demodulated data. These pieces of data are transmitted to and received from USB conversion IC 17 by means of communication using ATAPI bus 16 via interface part 12.

USB conversion IC 17 converts the received ATAPI signal to USB signal 18 and is connected to external personal computer 20 by means of a USB cable through USB connector 19 so that data is exchanged. System bus 15 is a bus for data transfer within the optical disc apparatus. The CPU 14 controls the digital signal processing part by means of a program recorded in the main memory. A digital system power supply circuit 26 stably supplies a variety of voltages to digital signal processing parts such as CPU 14, digital signal processing part 10 and memory 13.

The voltage supplied to circuit parts that drive these apparatuses has been converted from 100V AC to 6V DC by means of AC adaptor 21 and is supplied to the drive through DC jack 22. Power supply start-up circuit 25 detects the voltage of VBUS (power supply bus) 24 of USB connector 19 so as to supply or cut off a voltage to driving system power supply circuit 8 and to the digital system power supply circuit 26 so that drive starts up and is completed.

A rush current prevention circuit 27 of the VBUS that prevents an excessive current such as a surge from entering into an electronic device such as personal computer 20 at the time when it is connected via USB connector 19, and a relay circuit 28 for switching the power supply between being supplied by DCIN 23 and being supplied by VBUS 24 are provided in the periphery of VBUS 24. Ports for controlling relay circuit 28 and power supply start-up circuit 25 are added to CPU 14.

Here, the current that flows through the driving system of the optical disc apparatus is described. The main driving parts of the optical disc apparatus are spindle motor 3 (110 in FIG. 3), feed motor 2 (112 in FIG. 3), and actuator (incorporated in optical pick-up 4, 111*d* in FIG. 3). An actuator driving current flows through the actuator. The actuator carries out a tracking servo and a focusing servo of the laser beam that is emitted from object lens 111*c*, and therefore, in many cases, the actuator driving current finely fluctuates. In addition, a feed motor driving current flows through feed motor 112. Feed motor 112 drives object lens 111*c* in the direction of the radius of a disc and drives the entire carriage 111*a* when the movement cannot be followed by actuator 111*d*, and therefore, the driving conceptually becomes intermittent, and in many cases the driving current also fluctuates intermittently. A spindle motor driving current flows through spindle motor 110. Spindle motor 110 rotates and drives a disc without fine fluctuations, though in some cases, a rapid increase in the spindle motor driving current is caused at the time of a rising acceleration from the stopped condition.

Next, voltage dividing resistor 29 is described in detail in reference to FIG. 5. FIG. 5(*a*) is a diagram showing the configuration of a voltage dividing resistor. Voltage dividing resistor 29 is a conversion circuit of a signal voltage provided between motor driving circuit 6 and CD servo processor 9, and is formed of resistors R1, R1, R3 and a transistor Tr. An optical disc controller (ODC) 30 is formed within CD servo processor 9. A reference voltage (1.65V) is generated in VHALF of ODC 30 and a spindle control signal voltage is generated in SPD. A voltage for controlling voltage dividing circuit 29 is generated in CPUPORT of ODC 30 by an instruction from CPU 14.

Conventionally, the VHALF voltage of ODC 30 is transmitted to VHALF of motor driving circuit 6 and the SPD voltage of ODC 30 is transmitted to spindle motor control signal SPDRV of motor driving circuit 6 so that spindle motor 3 is controlled by the voltage across SPDRV and VHALF. Concretely, as shown in FIG. 5(*b*), when the voltage across SPDRV and VHALF is greater than reference voltage VHALF, spindle motor 3 is accelerated, and on the other hand, spindle motor 3 is decelerated when the voltage across SPDRV and VHALF is smaller than reference voltage VHALF, and in such a manner, spindle motor 3 is controlled by the voltage across SPDRV and VHALF.

Resistor R1 is provided between SPDRV of motor driving circuit 6 and SPD of ODC 30, while resistor R2 connects a node between SPDRV of motor driving circuit 6 and R1 to a node between VHALH of motor driving circuit 6 and VHALH of ODC 30, wherein a node between the emitter and the corrector of transistor Tr is placed between R2 and the node between SPDRV of motor driving circuit 6 and R1.

The operation of voltage dividing circuit 29 is described. In the case where a predetermined voltage is not generated between PORT of ODC 30 and VHALF, the node between the collector and the emitter of transistor Tr is turned off, making the voltage across point A and point B drop slightly, and therefore, the voltage across SPDRV and VHALF is approximately equal to the voltage across SPD and VHALF. When a predetermined voltage is generated across CPUPORT of ODC 30 and VHALF by means of an instruction from CPU 14 so that a predetermined voltage is applied across the base and the emitter of transistor Tr, the node between the collector and the emitter of transistor Tr is turned on, and the voltage across SPDRV and VHALF becomes a voltage that is acquired by dividing the voltage across SPD and VHALF by means of the elements between point A and point B and R1. Accordingly, as shown in FIG. 5(c), the voltage across SPDRV and VHALF becomes small, suppressing the operation of spindle motor 3. An instruction from CPU 14 to ODC 30 can be provided depending on software, and therefore, voltage dividing resistor 29 can be turned ON/OFF by means of software. That is to say, spindle motor 3 can be driven by easily switching between power saving mode and normal mode by means of software. The driving current of spindle motor 3 in the power saving mode can be suppressed to a lower level than that of the normal mode.

Here, transistor Tr functions as a switch for turning ON/OFF the node between point A and point C by receiving the voltage across SPD and VHALF, and may be another semiconductor device for carrying out the same function or a relay may be utilized in place of transistor Tr.

Next, the working effects of voltage dividing resistor 29 for reducing a temporary increase in the consumed current are described. The switching control between the power saving mode and the normal mode of the driving of spindle motor 3 by the turning ON/OFF of voltage dividing resistor 29 is carried out in a manner wherein spindle motor 3 is driven in the normal mode in the standby condition having a low power consumption, in the steady operation condition or in the condition of write-in of a disc that requires the stable control of spindle motor 3, and spindle motor 3 is driven in the power saving mode in the case where feed motor 2 creates a large movement or in the case where a large amount of power is collectively consumed at the time when the spindle motor is accelerated from the stopped condition, and thereby, a temporary increase in the power consumption of the entire optical disc apparatus can be reduced.

Schematically speaking, as shown in FIG. 6, a large spindle motor driving current temporarily flows in the case where spindle motor 3 is started up and is accelerated from the stopped condition. Contrary to this, the acceleration of the number of rotations is gradual, and it takes a long period of time before the number of rotations reaches a predetermined value when spindle motor 3 is started up from the stopped condition in the same manner under the condition where voltage dividing resistor 29 has been turned ON, and in this case, a temporary increase in the spindle motor driving current is also gradual so that the peak current can be suppressed to a low value.

The measured data of FIG. 7 is shown as waveforms of voltage dividing resistor control signal CPUPORT, spindle motor control signal SPDRV, actuator control signal TRDRV and a current consumed in the driving system which indicates the change in the current consumed in the driving system in response to the respective control signals. Here, at the time when the spindle motor starts up, the actuator is not normally driven, and therefore spindle motor control signal SPDRV is approximately 0 in the present measurement where the feed motor driving surrent is microscopic. Feed motor control signal (not shown) is 0 and feed motor driving current does not flow. As shown in FIG. 7(a), in the case where there are no voltage dividing resistors (CPUPORT is shown as 0V), the current consumed in the driving system promptly rises (B in the figure) at the same time when spindle motor control signal SPDRV rises (A in the figure, the lower side is positive), and reaches a constant value. Contrary to this, as shown in FIG. 7(b), in the case where there is a voltage dividing resistor which has been turned ON (the voltage of eV is outputted at CPUPORT), SPDRV is divided to be a voltage at a lower level (C in the figure, the lower side is positive) and the rise (D in the figure) of the current consumed in the driving system is extremely gradual.

Accordingly, in the case where spindle motor 3 starts up from the stopped condition and accelerates, a temporary large current flows, and when the current required for the entirety of the optical disc apparatus temporarily exceeds 500 mA, such an increase in the current is suppressed by turning ON the voltage dividing resistor so as to set the value of the current not to exceed 500 mA, and thereby, it becomes possible to drive the system constantly having VBUS 24 as the power supply.

Next, another configuration of the voltage dividing resistor is described in reference to FIG. 8. Within the configuration of FIG. 8, another configuration which is the same as that of FIG. 5 is provided. The two configurations share the resistor that is provided between SPORV of motor driving circuit 6 and SPD of ODC 30 from among the two resistors which contribute to the division of the voltage. That is to say, resistors R1, R2, R3 and transistor Tr1 form a first voltage dividing resistor 31, and resistors R1, R4, R5 and transistor Tr2 form a second voltage dividing resistor 32. In first voltage dividing resistor 31, a predetermined voltage is generated between CPUPORT1 of ODC 30 and VHALF by means of an instruction from CPU 14, and thereby, the node between the collector and the emitter of transistor Tr1 turns ON and the voltage across SPDRV and VHALF has a value acquired by dividing the voltage across SPD and VHALF using R1, transistor Tr1 and resistor R3 when the voltage across the base and the emitter of transistor Tr1 has become a predetermined voltage. In second voltage dividing resistor 32, when a predetermined voltage is generated between CPUPORT2 of ODC 30 and VHALF by means of an instruction from CPU 14, and thereby, the voltage across the base and the emitter of transistor Tr2 becomes a predetermined voltage, the node between the collector and the emitter of transistor Tr2 turns ON and the voltage across SPDRV and VHALF has a value acquired by dividing the voltage across SPD and VHALF using R1, transistor Tr1 and resistor R5. The first voltage dividing circuit and the second voltage dividing circuit have different voltage division ratios, and therefore the voltage across SPDRV and VHALF allows for three settings: in the case where the first voltage dividing circuit is turned ON and the second voltage dividing circuit is turned OFF, the first voltage dividing circuit is turned OFF and the voltage dividing circuit having the second configuration is turned ON, and in the case where the first voltage dividing circuit and the second voltage dividing circuit are both turned OFF.

Next, the working effects of the present configuration are described. In the present configuration, as in the description of the configuration of FIG. 5, the first voltage dividing circuit is utilized when a temporarily large current flows and the current required for the entirety of the optical disc apparatus exceeds 500 mA, such as in the case where feed motor 2 moves to a large extent and spindle motor 3 starts up from the stopped condition and accelerates.

The second voltage dividing circuit is used in the case where the optical disc apparatus reads out data that has been written in onto a disc or in the case where data is written in onto a disc. In the case where the optical disc apparatus reads out data that has been written in onto a disc or in the case where data is written in onto a disc, the actuator finely operates and the driving current of the actuator dramatically fluctuates. This can be the main cause of cases where the current required for the entirety of the optical disc apparatus only temporarily exceeds the tolerance. In response to this, the second voltage dividing circuit is turned ON so that the consumed current can be suppressed.

The measured data of FIG. 9 is shown as waveforms of control signal CPUPORT2 of the second voltage dividing resistor, spindle motor control signal SPDRV, actuator control signal TRDRV and a current consumed by the driving system which shows the change in the current consumed in the driving system in response to the respective control signals. Since spindle motor control signal SPDRV is approximately constant (e2V, the lower side is positive), the spindle motor rotates at approximately a constant speed. Here, the feed motor control signal (not shown) is 0 and the feed motor driving current does not flow. As shown in FIG. 9(a), in the case where the second voltage dividing resistor is turned OFF, the current consumed by the driving system has the maximum value in pulse form due to the effects of the actuator driving current in pulse form, and in some cases, this maximum value exceeds 500 mA. In response to this, as shown in FIG. 9(b), the voltage of spindle motor control signal SPDRV is lowered by turning ON the second voltage dividing resistor in a portion where a signal in pulse form is generated by actuator control signal TRDRV, that is to say, in a portion where an actuator driving current in pulse form is generated. As a result of this, the spindle motor driving current is reduced in the portion where the actuator driving current increases in pulse form, and therefore, the current consumed by the driving system can be prevented from partially exceeding 500 mA.

Though as described above, the power that is supplied to spindle motor 110 is reduced in the condition where the second voltage dividing resistor has been turned ON in response to an increase in pulse form in the actuator driving current, the interval in time is short and spindle motor 110 can approximately maintain the rotational speed due to inertia, and therefore, no negative effects such as rotational irregularity occur.

Here, it is also possible to form multiple stages, that is to say three or more stages, of voltage dividing circuits by repeating the above described configuration, and in this case, it becomes possible to adjust the voltage across SPDRV and VHALF more finely. In addition, though the voltage dividing resistors are utilized in order to control the current required for the entirety of the optical disc apparatus so as not to exceed 500 mA in the present embodiment, the limit current may have a predetermined current value other than 500 mA or the voltage dividing resistors may be utilized so that the current value of any portion of the optical disc apparatus is prevented from temporarily exceeding a predetermined current value. In addition, the voltage dividing resistors may be utilized in order to prevent the power required for the entirety of the optical disc apparatus or the power consumed by any portion of the optical disc apparatus from exceeding a predetermined value. Furthermore, the voltage dividing resistors may be utilized in order to reduce fluctuations of the current or of the power over the course of time.

Next, the control of an optical disc apparatus where the current supplied from the power source temporarily exceeds 500 mA even under the control of the above described voltage dividing resistors is described in reference to FIG. 4 and FIG. 10.

When the optical disc apparatus is connected (S1) to personal computer 20 by means of USB cable 27 via USB connector 19, the voltage of VBAS is supplied by personal computer 20, and therefore a VBUS voltage is generated as a result of the connection and power supply start-up circuit 25 operates by detecting this change so that power is supplied to driving system power supply circuit 8 and digital system power supply circuit 26 from VBUS and the power source is turned on (S2). The CPU monitors the voltages of VBUS and DCIN and carries out the setting wherein DCIN voltage is detected (S3), and relay circuit 28 uses AC adaptor 21 as the power supply (S4) in the case where AC adaptor 21 is connected to DC jack 22, and thereby, the power from AC adaptor 21 is supplied to the respective power supply circuits (S5). In addition, in the case where AC adaptor 21 is not connected to DC jack 22, relay circuit 28 is set so as to use VBUS as the power supply (S6), and thereby, the power is supplied to the respective power supply circuits from VBUS (S7) and CPU 14 detects that VBUS is the power supply (S8).

In the case when the VBUS is used as the power supply, first the driving system is not operated by means of an instruction from CPU 14 to driving system power supply circuit 8, and thereby, the supplied current is suppressed to a level of 500 mA or lower and only the circuit system is started up (S9), followed by communication with the personal computer by means of USB signal 18, and thus it is confirmed that the personal computer is a specified personal computer that can supply a current exceeding 500 mA (S10) (the method for confirmation is described later). Here, as the method for suppressing the supplied current to a level at or lower than 500 mA, the voltage dividing resistor having the configuration shown in FIG. 5 or the first voltage dividing resistor shown in FIG. 8 may be turned ON so that the driving of spindle motor 3 is switched to the power saving mode. The CPU determines whether the personal computer is a specified personal computer that can supply a current exceeding 500 mA (S11) and carries out an initialization process of the mechanics only in the case of the specified personal computer (S12) and the driving system is started up by the USB power supply (S13). In the case where the personal computer has been recognized as a normal personal computer, rush current prevention circuit 27 is turned OFF by power supply start-up circuit 25 (S14) and the supply from VBUS is cut off so that the drive is shut down (S15). Hereinafter, the system is not driven by VBUS power supply until the personal computer is restarted. As a result of this, it can be prevented in the conventional personal computer that a current exceeding 500 mA is supplied from VBUS by mistake, and it can also be prevented that the personal computer and its peripheral devices are hung up.

Next, the method according to which the optical disc apparatus confirms whether the personal computer connected to the optical disc apparatus is a personal computer that can supply a current exceeding 500 mA is described in reference to FIG. 11.

It is set in a specified personal computer that can supply a current exceeding 500 mA by VBAS, that a specified USB command or an ATA command (vendor command) wrapped in a USB packet that has been agreed between BIOS and the USB connection device when the optical disc apparatus is USB connected to the personal computer is issued to the optical disc apparatus. Such a setting may be executed in advance before shipment of the BIOS of the personal computer. In addition, in the case where an optical disc apparatus is connected to the personal computer for the first time, dedicated driver software is incorporated on the basis of Inquire information of the device and a list of specified personal computers that can supply a current exceeding 500 mA by means of VBAS has been prepared in the driver software attached to this optical disc apparatus so that it is determined whether the personal computer is on the list of the specified personal computers, and in the case where the personal computer is a specified personal computer, the setting has already been executed wherein a driver for issuing a specified USB command or an ATA command (vendor command) wrapped in a USB packet is incorporated in the optical disc apparatus.

At the time when the optical disc apparatus is connected to a personal computer, VBUS is turned ON, and therefore, VBUS of the optical disc apparatus is turned ON, and at the same time, the negotiation between BIOS of the personal computer and the optical disc apparatus starts (S16). When the negotiation is established, a specified USB command or an ATA command (vendor command) wrapped in a USB packet is awaited (S17). Whether the specified command has been received is determined (S18), and in the case where the specified command is received, the personal computer is recognized as a specified personal computer that can supply a current exceeding 500 mA by means of VBAS (S19). In the case where no specified command is received, the personal computer is not recognized as a specified personal computer that can supply a current exceeding 500 mA by means of VBAS (S20).

On the other hand, it is desirable for the personal computer to have a configuration that can stably supply power to the optical disc apparatus by means of VBUS with the maximum current exceeding 500 mA. Next, the configuration of a personal computer that can stably supply power to the external device by means of VBUS with the maximum current exceeding 500 mA is described in reference to FIG. 12 and FIG. 13.

At the time of the start-up of the personal computer, the personal computer acquires Inquire information of the optical disc apparatus that has been USB connected to the personal computer (S21) and identifies whether the optical disc apparatus is an optical disc apparatus that requires a current exceeding 500 mA by means of VBAS (S22). According to the method for identification, an ID list of optical disc apparatuses that require a current exceeding 500 mA by means of VBAS has been set in advance before shipment of BIOS of the personal computer so that the ID of the connected optical disc apparatus can be compared to the list. In addition, the ID may be taken in the personal computer by means of driver software for a personal computer that is attached to the optical disc apparatus that requires a current exceeding 500 mA by means of VBAS so that the ID of the device that has been USB connected to the personal computer can be recognized as the ID of the optical disc apparatus that requires a current exceeding 500 mA by means of VBAS.

In addition, at the time of the start-up of the personal computer, BIOS rises so as to supply VBUS power supply from USB power supply 28. The personal computer monitors the current of VBUS with a current detection circuit within USB power supply 28 and the threshold value of the current for monitoring is changed depending on whether the recognized device that has been USB connected is an optical disc apparatus that requires a current exceeding 500 mA by means of VBAS (S22). In the case where the optical disc apparatus is not an optical disc apparatus that requires a current exceeding 500 mA by means of VBAS, the threshold value of the current of VBUS is set at threshold value A (S23), and in the case where the optical disc apparatus is an optical disc apparatus that requires a current exceeding 500 mA by means of VBAS, the threshold value of the current of VBUS is set at threshold value B (S24). It is desirable for threshold value A to be an effective value current of 500 mA, and furthermore, the current may be rush current of 1.5 A or higher because it corresponds to the rush current at the time of the USB connection. In addition, it is desirable for threshold value B to be an effective value current having a value exceeding 500 mA.

Next, the current of VBUS that is being monitored (S25) is compared to the threshold value (S26), and in the case where the current has a value which is equivalent to or less than the threshold value, the start-up operation of the personal computer is continued (S27). In the case where the current is equal to or greater than the threshold value, the port of this USB interface is cut off (S28) and the start-up operation is continued (S27). In the start-up operation, in the case of the negotiation start-up between BIOS of the personal computer and the optical disc apparatus as described above, and in the case of the optical disc apparatus that can be started up by VBUS, a vendor command displaying a specified personal computer that can supply a current exceeding 500 mA is issued from BIOS of the personal computer by means of the USB signal.

In such a configuration, an optical disc apparatus can be implemented which is operated by the power from the AC adaptor in all the computers in the case where the AC adaptor is connected; which allows for the USB power supply driving only in specified computers wherein the USB power supply is reinforced in the case of the USB power supply driving to which no AC adaptors are connected; and which is not driven by the USB power supply in the case where the optical disc apparatus is connected to a conventional computer.

Here, according to the present embodiment, though an example where an optical disc apparatus is USB connected to a personal computer is described, the apparatus is not limited to an optical disc apparatus with USB connection, but may be an electronic device that is USB connectable (USB device). In this case, the USB device allows for the power supply for the operation from the personal computer by means of USB, and at this time, the invention is effective in the case where the current supplied by means of VBUS is required to exceed 500 mA. In addition, the personal computer is set so that it is possible to supply power to this USB device, and at this time, the invention is effective in the case where the supply current exceeding 500 mA can be supplied. In addition, the invention is effective in the case where the USB device and the personal computer are a USB device that requires the supply current exceeding 500 mA by means of VBUS and a personal computer that can supply a current exceeding 500 mA by means of VBUS, respectively, and in the case where they identify each other from among other USB devices or other personal computers. In addition, the object to which a USB device is connected is not limited to a personal computer, but may be a USB connectable electronic device and that can supply power to the connected device. In this case, a specified command displaying a specified electronic device of which the USB power supply has been reinforced by means that depend on BIOS or that are independent of BIOS is issued by the USB signal.

Here, though according to the present embodiment, an example of an optical disc apparatus is described, the embodiment can be applied to other disc apparatuses such as magnetic disc apparatuses including hard disc apparatuses.

The present invention can be applied to other disc apparatuses such as magnetic disc apparatuses including optical disc apparatuses and hard disc apparatuses, and in specified, can be effectively applied to optical disc apparatuses and other disc apparatuses which are USB connectable and which allow for the power supply by means of USB.

Embodiment 2

Figure 15:
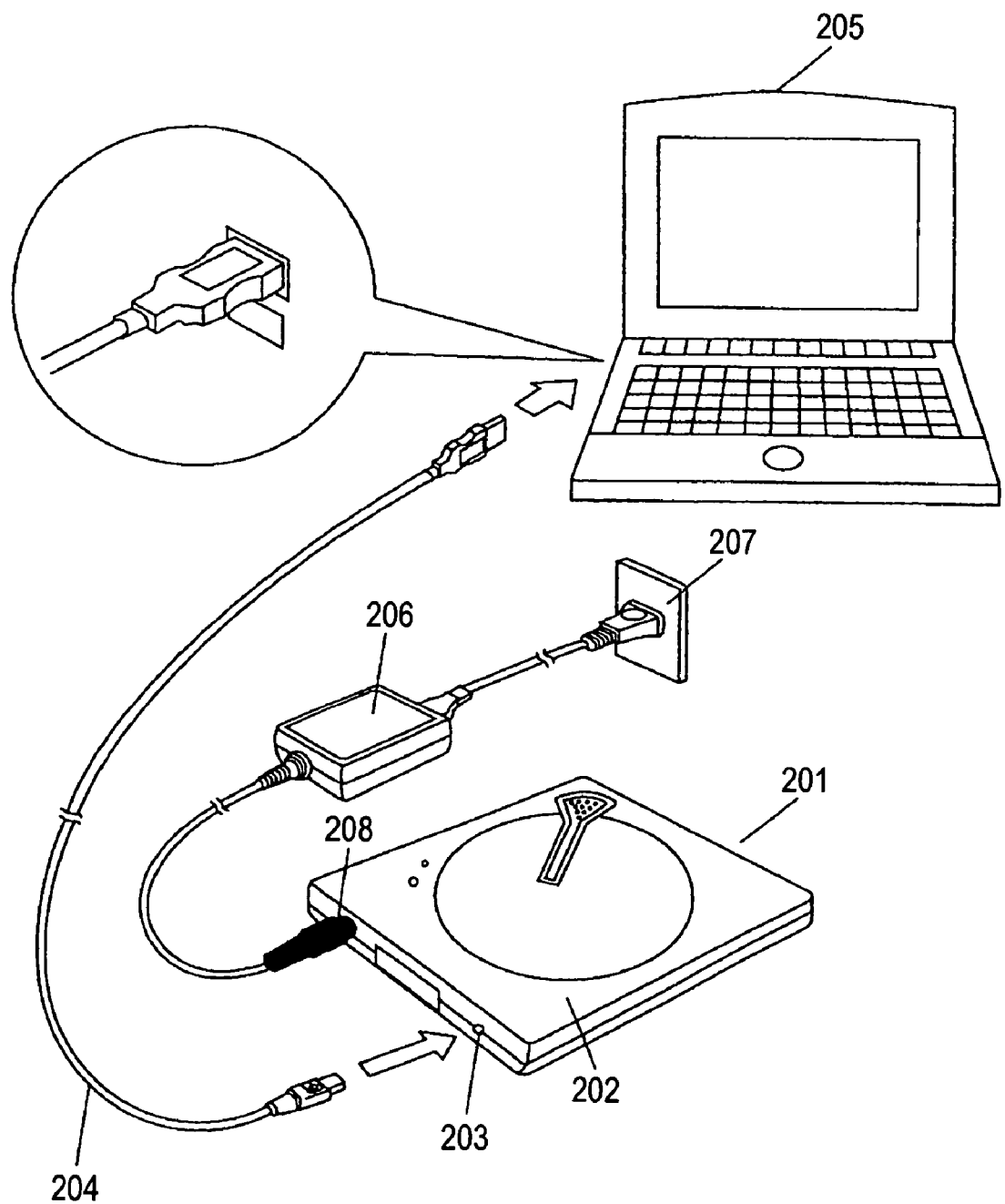
FIG. 15 is a diagram showing the appearance of the optical disc apparatus according to one embodiment of the present invention.
Figure 16:
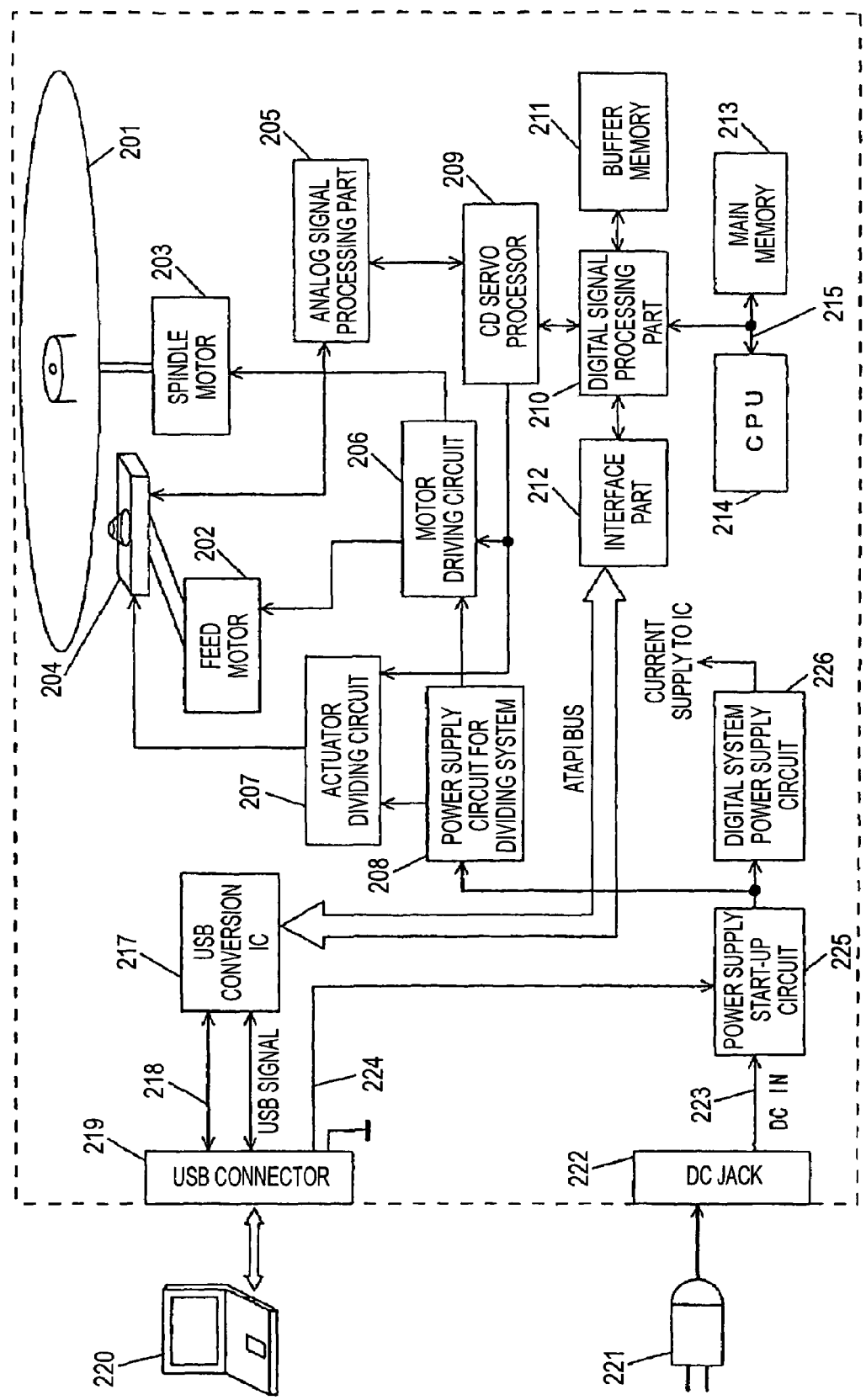
FIG. 16 is a block diagram showing the configuration of the optical disc apparatus according to one embodiment of the present invention.
Figure 17:
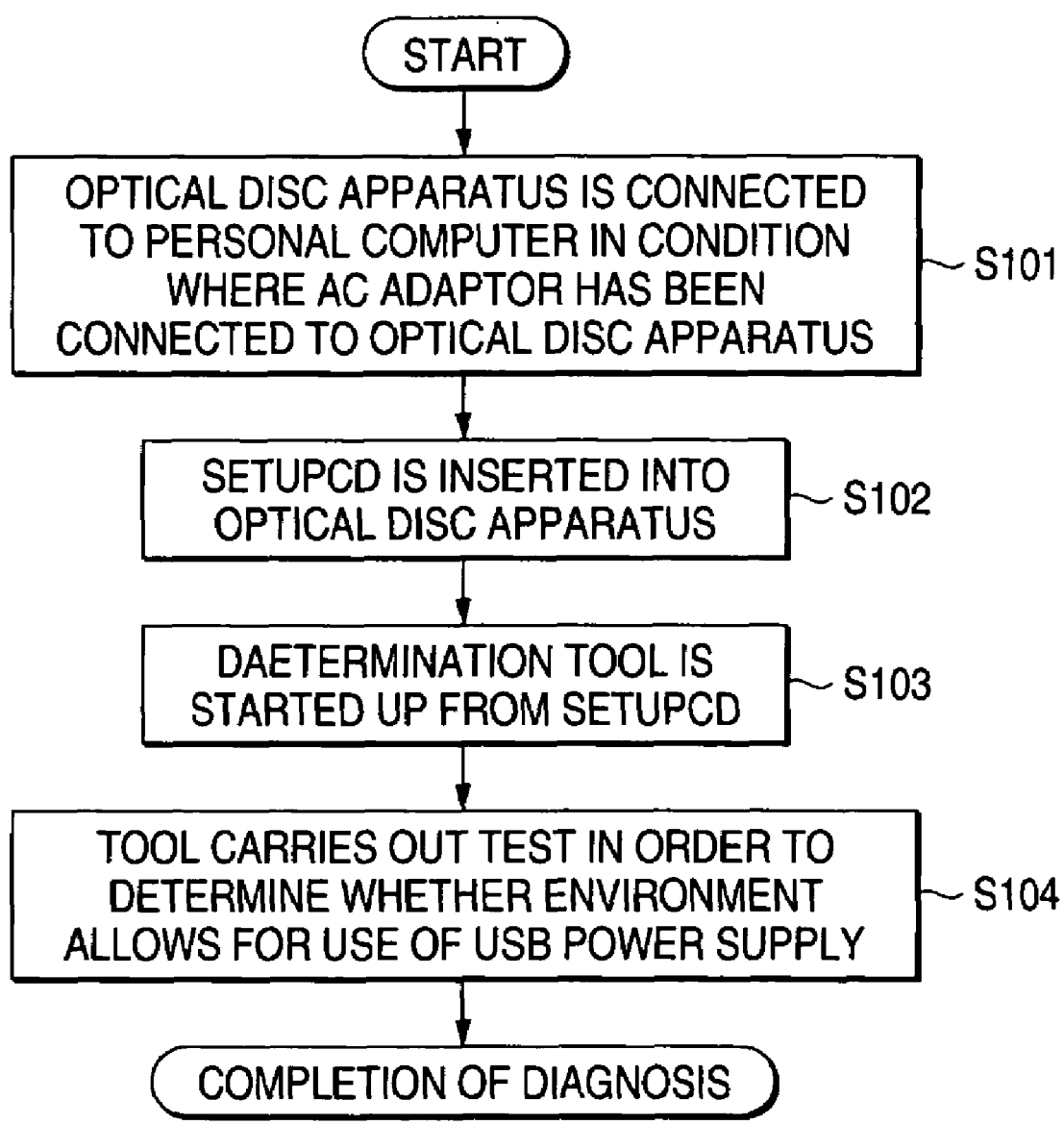
FIG. 17 is a flow chart showing the operation by the user of a tool for diagnosing the power consumption of the optical disc apparatus according to one embodiment of the present invention.
Figure 18:
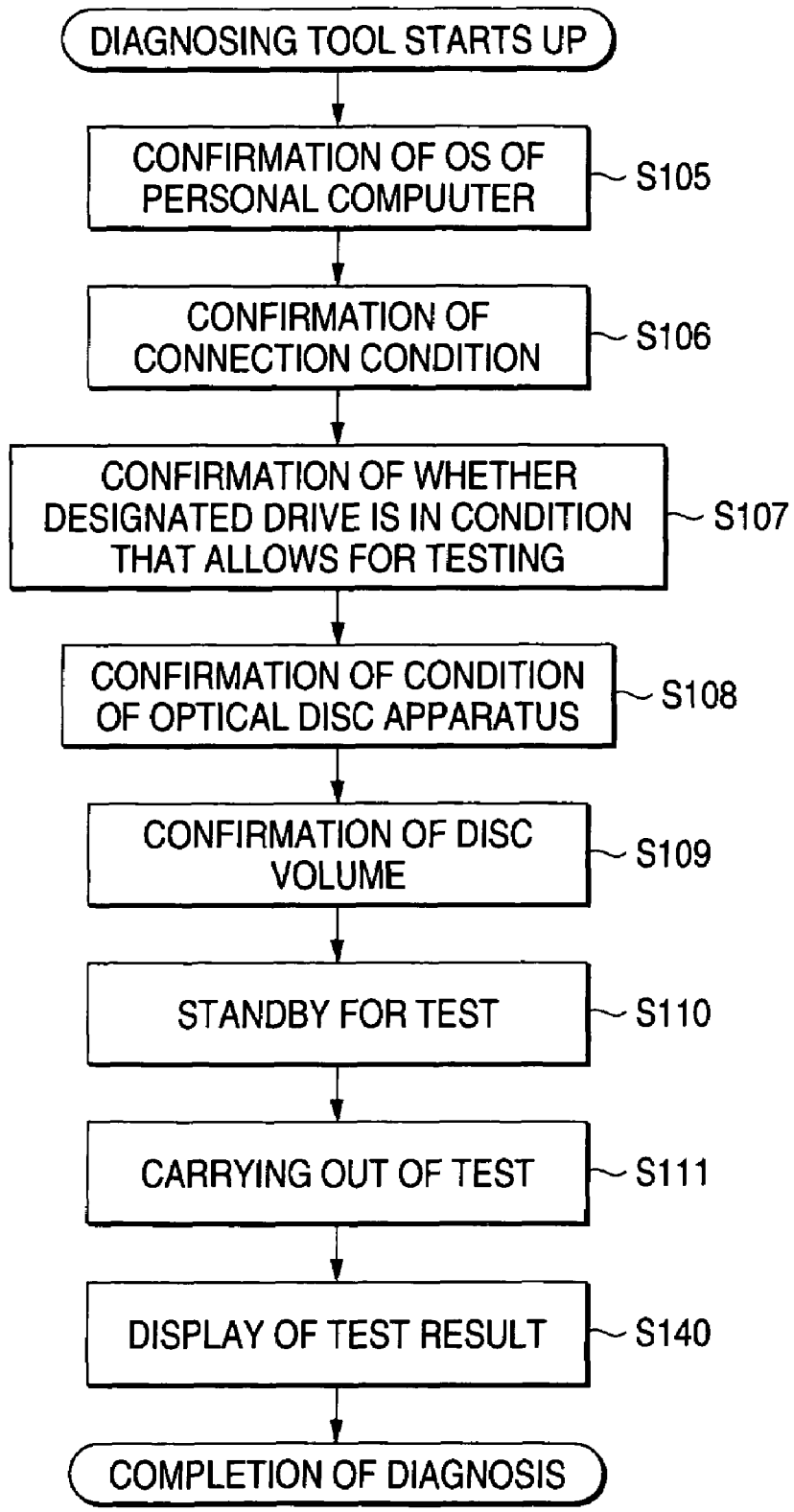
FIG. 18 is a flow chart showing the flow of the control in the tool for diagnosing the power consumption of the optical disc apparatus according to one embodiment of the present invention.
Figure 19:
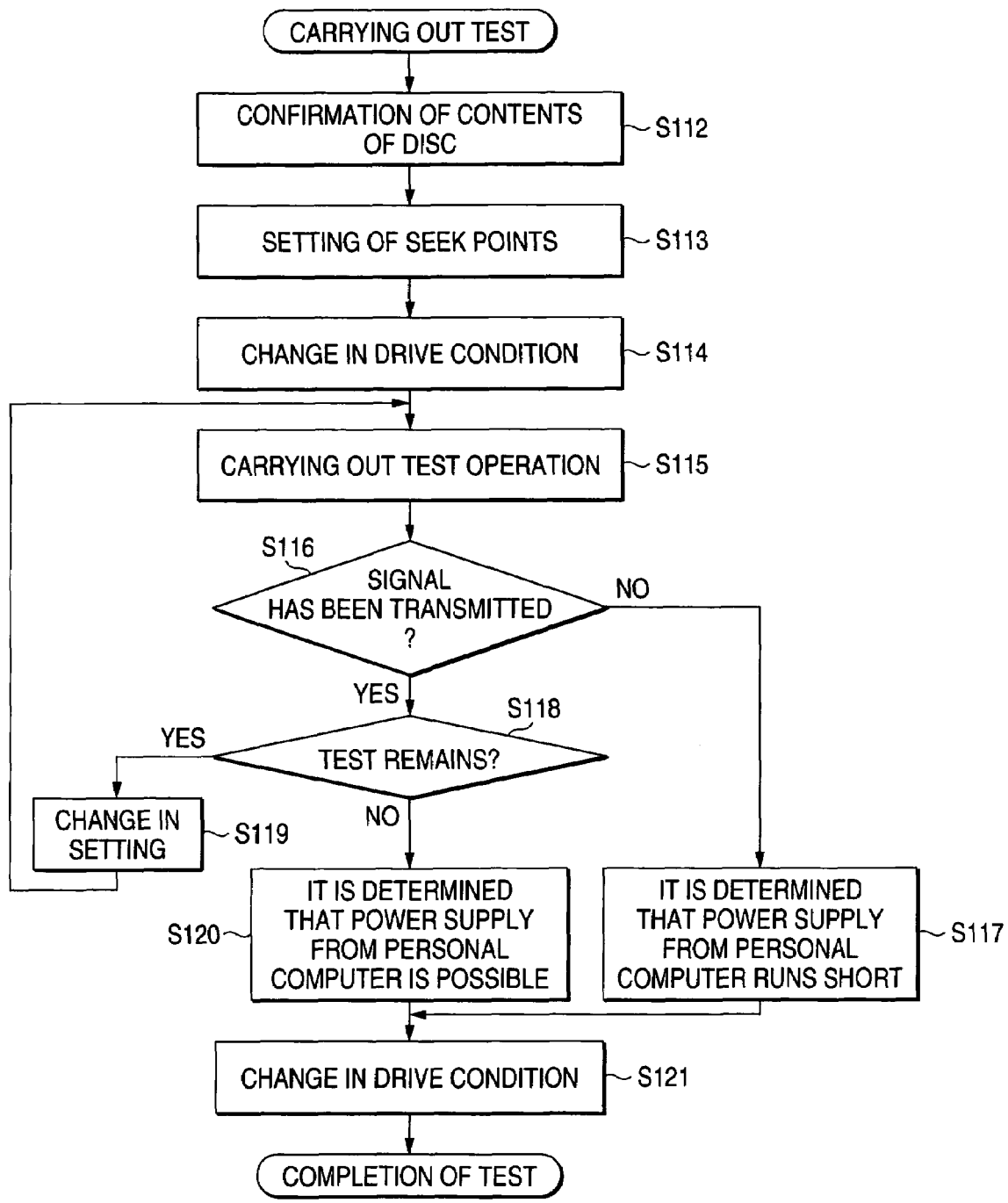
FIG. 19 is a flow chart showing the flow of the control of the power consumption test in the tool for diagnosing the power consumption of the optical disc apparatus according to one embodiment of the present invention.
Figure 20:
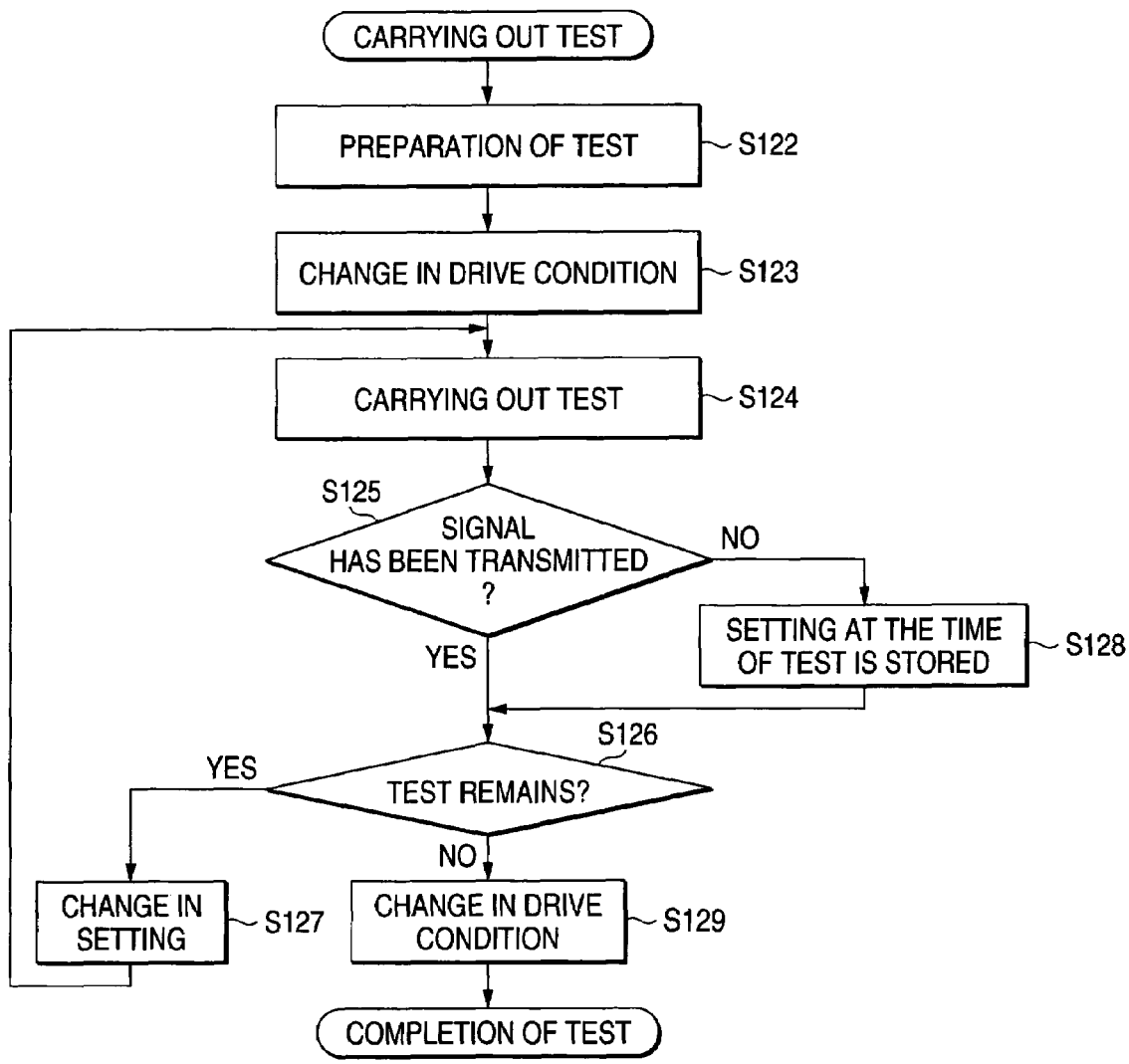
FIG. 20 is a flow chart showing the flow of the control of the power consumption test in the tool for diagnosing the power consumption of the optical disc apparatus according to another embodiment of the present invention.

FIG. 15 is a diagram showing the appearance of the optical disc apparatus according to one embodiment of the present invention, FIG. 16 is a block diagram showing the configuration of the optical disc apparatus according to one embodiment of the present invention, FIG. 17 is a flow chart showing the operation of the user of a tool for diagnosing the power consumption of the optical disc apparatus according to one embodiment of the present invention, FIG. 18 is a flow chart showing the flow of the control in the tool for diagnosing the power consumption of the optical disc apparatus according to one embodiment of the present invention, FIG. 19 is a flow chart showing the flow of the control of the power consumption test in the tool for diagnosing the power consumption of the optical disc apparatus according to one embodiment of the present invention, and FIG. 20 is a flow chart showing the flow of the control of the power consumption test in the tool for diagnosing the power consumption of the optical disc apparatus according to another embodiment of the present invention.

In FIG. 15, an optical disc apparatus 201 is a so-called external attachment type which is not incorporated in an electronic device such as a computer and in which an optical disc is inserted by opening an upper lid 202. A connector for USB connection, which is denoted by 203, is connected to, for example, a computer 205 by means of a USB cable 204 and, thereby, the computer can read out data from an optical disc or can write in data onto an optical disc. An AC adapter, which is denoted by 206, lowers the voltage and rectifies the current from an outlet 207 of the commercial power supply (for example, 100 V) and supplies the voltage and the current to optical disc apparatus 201 from a DC jack 208. There is a case where the acquirement of power of optical disc apparatus 201 depends on the power supply bus of USB cable 204 in addition to a case where it depends on AC adapter 206. Whether the power supply bus of USB cable 204 can constantly supply the power required by optical disc apparatus 201 primarily depends on the power supplying ability of computer 205. Optical discs include CD-ROMs, CD-R/RWs, DVD-ROMs, DVD-RAMs, DVD-R/RWs and DVD+R/RWs and optical disc apparatus 201 is compatible with one type or several types of these optical discs.

Here, AC adapter 206 may not be utilized, but rather a configuration wherein the commercial power supply is directly drawn in by an appropriate wire, and a connector may be used in the case where the optical disc apparatus is provided with a power supply circuit for converting the commercial power supply to a current and a voltage that are appropriate for internal utilization of the optical disc apparatus. In addition, a battery may be incorporated in or externally attached to optical disc apparatus 201 as the power supply for driving the optical disc apparatus without usage of the commercial power supply.

Next, the configuration of the circuit system of the optical disc apparatus is described in reference to FIG. 16. Logic determination and operations are carried out in CPU 114. A main memory, which is denoted by 113, has a program recording area for storing a control program and a recording control program for an optical disc recording apparatus. A buffer memory, which is denoted by 111, is utilized as a storage region that is required for data storage, recording control and reproduction control. A feed motor, which is denoted by 102, is driven by a motor driving circuit, which is denoted by 106. A spindle motor, which is denoted by 103, is driven by motor driving circuit 106 in the same manner. A pick-up unit, which is denoted by 104, is driven by an actuator driving circuit 107. Motor driving circuit 106 and actuator driving circuit 107 are servo controlled by a CD servo process 109. In addition, power is supplied to motor driving circuit 106 by a driving system power supply circuit 108.

In the reproduction system, an optical signal acquired from optical disc 101 and pick-up unit 104 is signal processed by analog signal processing part 105 so as to be used as the feed back signal of CD servo process 109, and at the same time, becomes an input signal of digital signal processing part 110 so as to be demodulated to a digital signal and the resulting signal is stored in buffer memory 111. Buffer memory 111 is a memory for temporarily storing recording data and the demodulated data. These pieces of data are received by and transmitted to a USB conversion IC 117 by means of the communication using ATAPI bus 116 through interface part 112.

USB conversion IC 117, which converts the received ATAPI signal to a USB signal 118, is connected to an external host computer 120 by means of USB cable 204 through USB connector 119 so that data can be exchanged. System bus 115 is a bus for data transfer within optical disc apparatus 201. The CPU controls the digital signal processing part using the program recorded in the main memory. Digital system power supply circuit 126 stably supplies a variety of types of voltages to the digital signal processing parts such as CPU 114, digital signal processing part 110 and memory 113.

AC adapter 121 converts 100 V AC to 6 V DC, which is supplied to the drive by means of DC jack 122. Power supply start-up circuit 123 detects the voltage of VBUS (power supply bus, hereinafter referred to as USB power supply) of USB connector 119 so as to select the power supply and starts up or completes the drive by supplying or terminating the voltage to driving system power supply circuit 108 of the drive or digital system power supply circuit 125.

Next, the procedure of diagnosing whether the power supply from the computer, which has been connected by the user, is possible in the optical disc apparatus according to the embodiment of the present invention is described in reference to FIG. 17.

First, the optical disc apparatus is connected to the computer (S101). At this time, in the case where the apparatus is operated by the USB power supply from the beginning, even a failure of read-in of the optical disc might occur and, therefore, AC adapter 121 is connected in advance. Next, the setup CD is attached to the optical disc apparatus (S102) so as to start up a diagnosing tool, which is application software (S103). Here, the diagnosing tool may be directly started up from the setup CD or the diagnosing tool may be installed from the setup CD to the computer so that the installed diagnosing tool may be started up. The diagnosing tool stored in the setup CD is read out by pick-up unit 104 and then is taken into computer 120 by means of USB through analog signal processing part 105, CD servo processor 109, digital signal processing part 110, interface part 112 and I/F conversion IC 117. A test is carried out by executing the diagnosing tool in computer 120 and diagnosis is carried out as to whether the environment allows power supply by means of the USB power supply (S104). The diagnosing tool may be taken into computer 120 by downloading it to the computer from a predetermined download site of the Internet. As a result of the diagnosis, whether the power supply is possible by means of the USB power supply is displayed on the screen of computer 120 by stating, for example, OK/NG, and, therefore, it is possible to utilize the optical disc apparatus without AC adapter 121 in combination with the computer which is hereinafter diagnosed in the case where diagnosis has been established that the power supply is possible by means of the USB power supply. In the case where the diagnosis has been established that the power supply is impossible by means of the USB power supply, there is a possibility that the operation becomes defective due to a shortage of power supply depending on the operation mode and, therefore, it is desirable to utilize AC adapter 121.

Next, the manner of how the diagnosing tool is controlled is described in reference to FIG. 18.

When the diagnosing tool is started up, the diagnosing tool first confirms the OS utilized in the computer (S105). In the case where the OS which does not correspond to the present optical disc apparatus is utilized, the diagnosis is cancelled by issuing an error message.

Next, the diagnosing tool confirms the condition of connections of the optical disc apparatus (S106). In the case where the optical disc apparatus is not correctly connected, the diagnosing tool displays an error displaying that the diagnosing tool is started up again after confirmation of the connections and then the diagnosis is cancelled.

Next, it is confirmed whether the optical disc apparatus is in the condition where testing is possible (S107). In the case where two or more connection devices are connected to the USB, for example, there is a possibility that they are both supplied power from the USB power supply. In this case, there is a possibility that the diagnosis result becomes imprecise and, therefore, an error is issued. In the case where a connection device other than the present optical disc apparatus is connected as a result of confirmation of whether a connection device other than the present optical disc apparatus has been connected to the USB, a display is made to this effect displaying that a test cannot be carried out and then the diagnosis is cancelled.

Next, the condition of the optical disc apparatus is confirmed (S108). The diagnosing tool issues a vendor command from the computer 120 side to the optical disc apparatus and the information of the drive condition stored in main memory 113 is taken in for confirmation. The vendor command is transmitted to CPU 114 from the USB through I/F conversion IC 117, the ATAPI bus, interface part 112 and digital signal processing part 110. Information of the drive condition, for example, whether the upper lid is open, and the information concerning the condition of the AC adapter, the condition of the power supply switch, the condition of the power supply mode (normal mode or energy saving mode) of the optical disc apparatus, the condition of the dip switch and the like are acquired as the condition of the port of CPU 114 of which the results are stored in main memory 113. The diagnosing tool operates CPU 114 by issuing the vendor command and the above described pieces of information are acquired from the optical disc apparatus so that it is confirmed whether the condition allows for a test to be carried out. In the case where the condition does not allow for the test to be carried out a display is made to this effect displaying that the condition be changed so that the test can be carried out and then the diagnosis is cancelled.

Next, the disc volume is confirmed (S109). A dedicated optical disc is inserted into the optical disc apparatus so that the test can be carried out while reading out the data of the disc and, therefore, whether the dedicated optical disc has been inserted or not. Whether the disc is a dedicated optical disc is confirmed by reading out the disc volume provided on the disc. The information of the disc volume is read out at the time of the initial read-out from optical disc 1 and the diagnosis tool acquires this information, which is stored in main memory 113, by issuing a vendor command. In the case where a dedicated optical disc has not been inserted, the diagnosing tool displays that a dedicated optical disc be inserted and waits for the insertion of a dedicated optical disc.

Next, the test standby condition is acquired (S110). Up to this point, the optical disc apparatus has been operated in the condition where an AC adapter has been attached, however, the test is carried out in the condition where AC adapter 121 is unplugged because in the case where the AC adapter is connected, power is supplied from the AC adapter without utilizing the power supply from the USB power supply. In some cases, a problem arises when the AC adapter is unplugged while the optical disc is rotating and, therefore, first the optical disc is stopped. Then, the start button for the test is displayed on the screen and at the same time, instruction is displayed that the start button must be clicked after removing the AC adapter. Furthermore, the condition of the AC adapter is monitored by using the vendor command and the system is made to wait until the AC adapter is unplugged. A signal is sent periodically from jack 122 to CPU 114 to see if the AC adapter has been unplugged or a signal is sent when the AC adapter is unplugged and, thereby, CPU 114 monitors the condition of the AC adapter and the latest condition of the AC adapter is stored in main memory 113. The diagnosing tool acquires the condition of DC jack 122 that has been stored in main memory 113 and, thereby, acquires information regarding whether the AC adapter has been unplugged. In the case where the AC adapter has not been unplugged after a certain period of time, instruction is displayed that the AC adapter be unplugged.

The test is started when the start button is clicked in the condition where the test can be carried out (S111). The manner of how the test is controlled is shown in FIG. 19.

First, information of the optical disc is read in so as to acquire the address of the outer-most periphery (S112). Next, on the basis of this result, several seek points are appropriately set between the inner-periphery and the outer-periphery (S113). Preferably, approximately five seek points are set at equal intervals between the inner-periphery and the outer-periphery. Here, this is carried out as an example of the later described preparatory stage of the test. Next, a vendor command is issued to the optical disc apparatus and the driving condition is shifted to the test condition (S114). Concretely speaking, a mode of which the consumption current is slightly higher than that of the mode for the operation utilizing a conventional USB power supply is set for the next test which is carried out next. The test is carried out in the condition of this mode and, thereby, it becomes possible to determine the result in the condition where there is a margin slightly greater than that of the normal operation. At this time, a command is issued to CPU 114 from the diagnosing tool of computer 120 so that the optical disc apparatus is operated in the mode of which the consumption current is slightly higher than that of the normal operation. CPU 114 receives the command so as to operate the optical disc apparatus in the mode of which the consumption current is slightly higher than that of the normal operation.

Next, the test is started. The test carries out a variety of operations having different levels of power consumption of the optical disc apparatus and it is confirmed whether the power supply runs short.

The test operation is carried out concerning the intervals between the seek points that have been set in advance such as the operations of reading, jumping and reading in a predetermined order. The power consumption of the optical pickup during feeding due to reading and jumping differs depending on the seek points and the intervals between the seek points. These operations are carried out at an appropriate double speed read-out. For double speed read-out, several types of modifications may be carried out. Sequential operations may be repeated several times. In addition, one type of or several types of combinations of seek points or manners of read-out at double speed are set in advance in a manner where the power consumption is temporarily increased so that the test may be carried out on these combinations. Here, shifts between the seek points are carried out by means of feed motor and the change in the number of rotations of the optical disc at the time when the speed of read-out is increased two times is carried out by means of spindle motor 103 and they are both driven by motor driving circuit 106.

It is desirable for the operation setting for the test to include operation settings that allow the power consumption of the optical disc apparatus to become the maximum or approximately the maximum in order to enhance the reliability of the test. The operation setting for the test may include the setting of pick-up unit 114 that is driven by actuator driving circuit 107, the setting of the laser beam with which an optical disc is irradiated and the setting of the other circuit systems in addition to the operation settings of feed motor 102 and spindle motor 103.

As a result of this test, in the case where the power supply from the computer temporarily runs short, the data transmission of read-out information or the like that has been transmitted to the computer from the optical disc apparatus during the test is terminated. Accordingly, the termination of this data transmission is taken into consideration when determining the shortage of the power supplied from the computer. As shown in FIG. 19, for example, the test operation is carried out concerning the intervals between the seek points that have been set in advance (S115) so as to monitor whether the data transmission from the optical disc apparatus has been terminated (S116) and it is determined that the power supply from the computer runs short in the case where the data transmission has been terminated (S117). In the case where the data transmission has not been terminated, it is confirmed whether the test remains (S118) and the setting is changed in the case where the test remains (S119) so as to carry out the test operation. In the case where the data has been transmitted concerning the entire test, it is determined that the power supply from the computer is possible (S120). A vendor command is issued to the optical disc apparatus so that the drive is returned to the condition before the test (S121) so as to complete the test.

When the test is completed, the test result is displayed on the screen. In the case where it is determined that the power supply from the computer is possible, a display is made to this effect. In the case where it is determined that the power supply from the computer runs short, a display is made to this effect displaying the instruction to utilize an AC adapter.

Here, though in the present test example, at the point in time when the data transmission is terminated once it is determined that the power supply from the computer runs short, the test may be continued even when the termination of the data transmission has occurred so that it can be determined that the power supply from the computer runs short after the completion of the sequential test.

A vendor command is issued from the diagnosing tool to CPU 114 and, thereby, the diagnosing tool determines the drive condition stored in main memory 113 and in addition, a vendor command is issued to CPU 114 so that the conditions of the test are instructed and, thereby, all of the operations of the test are carried out.

FIG. 20 shows another example of the test. In this example of the test, the diagnosing tool is prepared with a table having a combination of settings, which may possibly occur at the time of the actual usage and which may increase the power consumption, such as the operation setting of spindle motor 103, the operation setting of feed motor 104, the setting of reading, writing and the like of pick-up unit 104. It is desirable to include the operation settings where the power consumption of the optical disc apparatus becomes the maximum or approximately the maximum in order to enhance the reliability of the test. In FIG. 20, the test preparation (S122) is made before this test is carried out and includes confirmation of the contents of the optical disc of FIG. 19 (S112) and the setting of seek points (S113).

After the test preparation (S122), the drive condition is changed (S123) and the test is carried out (S124). The test is carried out while changing the combination of the settings in accordance with the above described table. It is monitored whether the data transmission from the optical disc apparatus has been stopped (S125) and it is determined whether the test still remains (S126). In the case where the test remains, the setting is changed to the next (S127) so as to carry out the test. In the case where shortage of the power supply occurs under the setting for the test and the signal transmission has been terminated, this setting for the test is stored (S128). It is determined whether the test still remains (S126) and in the case where the test remains, the setting is changed to the next (S127) so as to carry out the test. When the test does not remain, the drive is returned to the condition before the test (S129) so as to complete the test. At the time of completion of the test, it is determined that the power supply from the computer is possible in the case where the setting at the time of the test is not stored in (S128) while it is determined that the power supply from the computer runs short in the case where the setting at the time of the test is stored.

Next, at the stage of displaying the test result of FIG. 20 (S140), the test result is displayed on the screen and the stored setting where the shortage of the power supply has occurred is transmitted to the optical disc apparatus and is stored in main memory 113.

After while preventing the settings which has been stored in main memory 113 because the shortage of the power supply have occurred at the time when the optical disc apparatus has been operated. By doing so, the number of combinations of the computer and the optical disc apparatus that receives the power supplied from the computer can be increased.

Here, in the case where the optical disc apparatus cannot be operated stably by avoiding the setting where the power supply runs short according to the result of the test, a display is made to this effect at the stage where the test result is displayed (S140) displaying an instruction to use an AC adapter.

Figure 21:
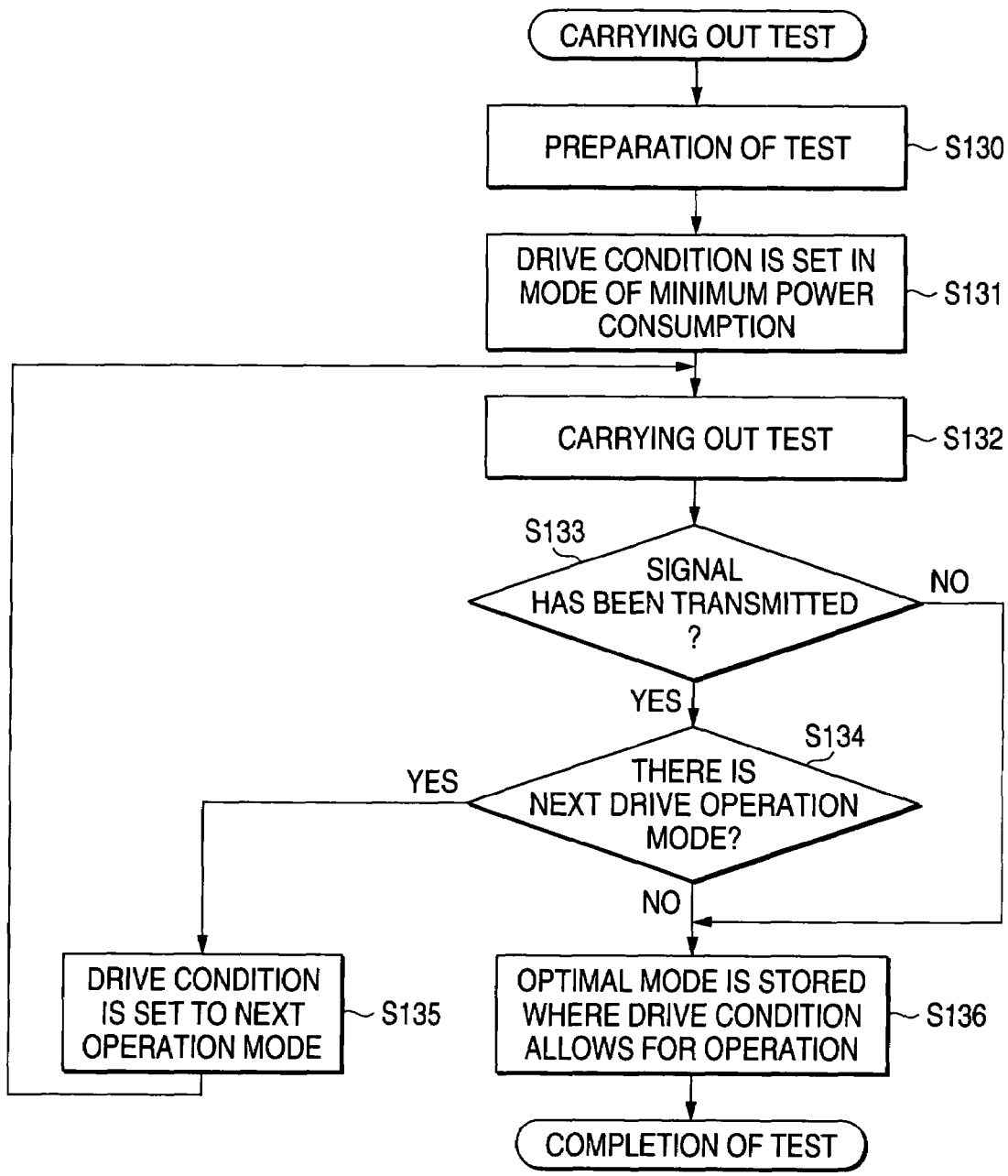
FIG. 21 is a flow chart showing the flow of the control of the power consumption test in the tool for diagnosing the power consumption of the optical disc apparatus according to another embodiment of the present invention.

In addition, FIG. 21 shows another example of the test.

Several patterns of the operation modes are prepared for the drive. These modes are managed in order in accordance with the power consumption and are stored in main memory 113. The diagnosing tool prepares the test (S130) and carries out the test (S132) in the mode having the lowest power consumption (S131) by issuing a vendor command to CPU 114. In the case where the signal has been transmitted displaying the operation is OK (S133), it is determined whether there is a mode where the power consumption is one step higher (F134). When there is a mode where the power consumption is one step higher this mode is set (S135) so that the sequential test is carried out (S132). In the case when the operation is OK, the mode is shifted so as to have a higher power consumption sequentially. In the case where the operation is NG in S133, the condition where the operation finally becomes OK is stored in main memory 113 (S136) so as to complete the test. Hereinafter, the operation is carried out in the stored mode at the time when the power is started up. By doing so, it becomes possible to carry out the operation under the optimal operation conditions which are possible under the user environment.

Though in the above described embodiment an optical disc apparatus is selected as a connection device that receives power supply from another electronic device, any electronic device which transmits and receives a signal to and from another electronic device and which receives power supply from another electronic device may be selected as a connection device without being limited to an optical disc apparatus. In addition, though in the present embodiment a USB interface is adopted as a connection part to another electronic device such as a computer, any interface that has both a power conveyance function and signal conveyance function may be used as the connection part and may be an IEEE1394. Furthermore, though in the present embodiment a computer is selected in order to transmit a signal to and receive a signal from a connection device such as an optical disc apparatus and in order to supply power to a connection device, any electronic device can be used without being limited to a computer as long as power supply to a connection device such as an optical disc device is possible and as long as it has a means for issuing an instruction to make the connection device such as the optical disc apparatus carry out this test operation for diagnosing the power consumption of the connection device such as the optical disc apparatus.

The present invention can be utilized in the case wherein power is required to be stably supplied from an electronic device having a power supplying part to a connection device where the connection device is utilized by being connected to the electronic device by means of a connection part such as a USB that has both the power conveyance function and the signal conveyance function.

In addition, it is possible to implement by combining the embodiment 1 and the embodiment 2.

This application is based upon and claims the benefit of priority of Japanese Patent Application No 2003-296058 filed on Aug. 20, 2003, Japanese Patent Application No 2003-352016 filed on Oct. 10, 2003, Japanese Patent Application No 2004-211320 filed on Jul. 20, 2004, the contents of which are incorporated herein by reference in its entirety.

What is claimed is:

1. A power diagnosis method of an optical disc apparatus in a system in which a cable for acquiring power and inputting/outputting a signal from an electronic device connects the electronic device and the optical disc apparatus, further the optical disc apparatus and an AC adapter are connected, the power diagnosis method comprising:
    a step in which it is determined that the optical disc apparatus is in a test standby condition, by a control program that is executed in the electronic device; and
    a step in which, when the optical disc apparatus is under the test standby condition, the AC adapter is disconnected and the optical disc apparatus is power supplied by the cable;
    a step in which the optical disc apparatus is test operated in an operation setting where the power consumption of the optical disc apparatus becomes the maximum by the control program; and
    a step of evaluating the transmission of a signal from the optical disc apparatus to the electronic device by the test operation.

2. The power diagnosis method of a connection device according to claim 1, wherein: according to the test operation, the connection device is operated under one type or a plurality of types of operation setting(s) by the control program so that it is evaluated whether the power consumption in each of the operation conditions can be supplied from the electronic device.

3. The power diagnosis method of a connection device according to claim 2, wherein: the operations having different power consumption of the connection device are at least included under the operation settings.

4. The power diagnosis method of a connection device according to claim 3, wherein:
    the electronic device is a computer;
    the cable is a USB (universal serial bus); and
    the connection device is an optical disc apparatus.

5. The power diagnosis method of a connection device according to claim 2, wherein: the operation having the maximum or approximately maximum power consumption of the connection device is at least included under the operation settings.

6. The power diagnosis method of a connection device according to claim 5, wherein:
    the electronic device is a computer;
    the cable is a USB (universal serial bus); and
    the connection device is an optical disc apparatus.

7. The power diagnosis method of a connection device according to claim 2, wherein:
    the electronic device is a computer;
    the cable is a USB (universal serial bus); and
    the connection device is an optical disc apparatus.

8. The power diagnosis method of a connection device according to claim 1, wherein: a user executes the control program in the electronic device so that the evaluation result is displayed on a display apparatus of the electronic device.

9. The power diagnosis method of a connection device according to claim 8, wherein:
    the electronic device is a computer;
    the cable is a USB (universal serial bus); and
    the connection device is an optical disc apparatus.

10. The power diagnosis method of a connection device according to claim 1, wherein:
    the test operation has a plurality of types of operation settings;
    operations are carried out under different operation settings which are changed from an operation setting having a lower power consumption to an operation setting having a higher power consumption during the plurality of types of operation settings of the connection device; and the setting is acquired where the power consumption becomes the highest allowing for the power supply from the electronic device during the plurality of types of operation settings.

11. The power diagnosis method of a connection device according to claim 10, wherein:
    the electronic device is a computer;
    the cable is a USB (universal serial bus); and
    the connection device is an optical disc apparatus.

12. The power diagnosis method of a connection device according to claim 1, wherein:
    the electronic device is a computer;
    the cable is a USB (universal serial bus); and
    the connection device is an optical disc apparatus.

13. A power diagnosis system comprises:
    an AC adapter;
    an optical disc apparatus connected to the AC adapter;
    an electronic device having a control program executed therein; and
    a cable, for acquiring power and inputting/outputting a signal from the electronic device, that connects the electronic device and the optical disc apparatus, wherein:
    the control program determines whether the optical disc apparatus is in a test standby condition, and if so, the AC adapter is disconnected and the optical disc apparatus is power supplied by the cable,
    the control program operates the optical disc apparatus in an operation setting where the power consumption of the optical disc apparatus becomes the maximum, and
    the control program evaluates whether a signal is transmitted from the optical disc apparatus to the electronic device when the power consumption becomes maximized.

* * * * *